US012264030B2

(12) United States Patent
Nishikawa

(10) Patent No.: US 12,264,030 B2
(45) Date of Patent: Apr. 1, 2025

(54) STICKING APPARATUS

(71) Applicant: Yoshihide Nishikawa, Osaka (JP)

(72) Inventor: Yoshihide Nishikawa, Osaka (JP)

( * ) Notice: Subject to any disclaimer, the term of this patent is extended or adjusted under 35 U.S.C. 154(b) by 145 days.

(21) Appl. No.: 17/999,475

(22) PCT Filed: Feb. 24, 2021

(86) PCT No.: PCT/JP2021/006762
§ 371 (c)(1),
(2) Date: Nov. 21, 2022

(87) PCT Pub. No.: WO2021/235035
PCT Pub. Date: Nov. 25, 2021

(65) Prior Publication Data
US 2023/0192436 A1 Jun. 22, 2023

(30) Foreign Application Priority Data

May 22, 2020 (WO) .................. PCT/JP2020/020256
Feb. 21, 2021 (JP) ................................. 2021-025768

(51) Int. Cl.
*B65H 37/04* (2006.01)
*B65H 35/00* (2006.01)
(Continued)

(52) U.S. Cl.
CPC ......... *B65H 37/04* (2013.01); *B65H 35/0006* (2013.01); *B65H 37/02* (2013.01); *C09J 5/00* (2013.01); *C09J 7/38* (2018.01)

(58) Field of Classification Search
CPC .... C09J 5/00; C09J 7/38; B65H 37/02; B65H 37/04; B65H 35/0006
(Continued)

(56) References Cited

U.S. PATENT DOCUMENTS 6,024,148 A * 2/2000 Saitoh .................. B65H 37/002
156/519
10,815,086 B1 * 10/2020 Taki .......................... B42C 1/12
2015/0368517 A1 * 12/2015 Yasuzawa ................. B32B 3/10
156/574

FOREIGN PATENT DOCUMENTS

CN 112249789 A * 1/2021 ......... B65H 35/0073
JP 2010-023131 2/2010
(Continued)

OTHER PUBLICATIONS

Espacenet machine translation of CN112249789A; https://translationportal.epo.org/emtp/translate/?ACTION=description-retrieval&COUNTRY=CN&ENGINE=google&FORMAT=docdb&KIND=A&LOCALE=en_EP&NUMBER=112249789&OPS=ops.epo.org/3.2&SRCLANG=zh&TRGLANG=en (Year: 2021).*
(Continued)

*Primary Examiner* — Leslie A Nicholson, III
(74) *Attorney, Agent, or Firm* — HSML P.C.

(57) ABSTRACT

A sticking device implements high-speed automatic processing of base-sheet-attached shrink-film packaging using a half-cut double-faced adhesive tape. A sticking device rolls a half-cut double-faced adhesive tape over a first sticking object that is transported on a conveyor device to stick the adhesive tape to the first sticking object and then places a second sticking object on the first sticking object and applies pressure to stick the first sticking object and the second sticking object together. The sticking device includes: a feeder device that feeds the first sticking object; a conveyor device; an adhesive-tape sticking device that has a roll body attaching part for rotatably supporting a half-cut double-faced adhesive tape with a peel-off liner, a rotary-sticking roll pressure part, and a peel-off liner collecting part; and a second sticking object sticking device that places a second
(Continued)

sticking object on the sticking portion of the first sticking object and applies pressure.

15 Claims, 22 Drawing Sheets

(51) Int. Cl.
*B65H 37/02* (2006.01)
*C09J 5/00* (2006.01)
*C09J 7/38* (2018.01)

(58) Field of Classification Search
USPC .......................................... 270/58.07, 58.08
See application file for complete search history.

(56) References Cited

FOREIGN PATENT DOCUMENTS

| | | |
|---|---|---|
| JP | 2012-084688 | 4/2012 |
| JP | 2016-008262 | 1/2016 |
| JP | 2016-082166 | 5/2016 |
| JP | 2018-111574 | 7/2018 |
| JP | 2018-111575 | 7/2018 |

OTHER PUBLICATIONS

International Search Report of PCT/JP2021/006762, May 11, 2021, 6 pages including English translation.

* cited by examiner (a) 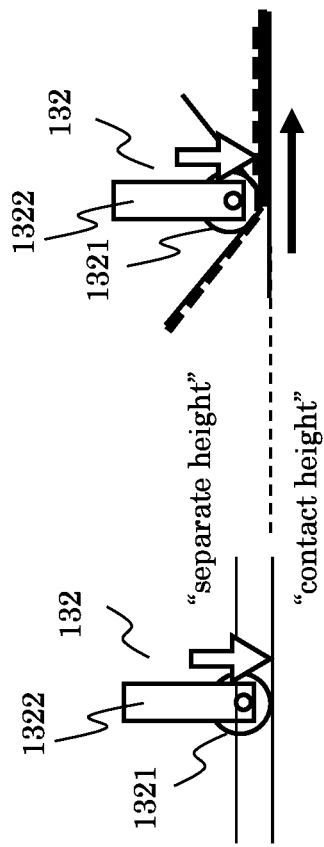
(b) 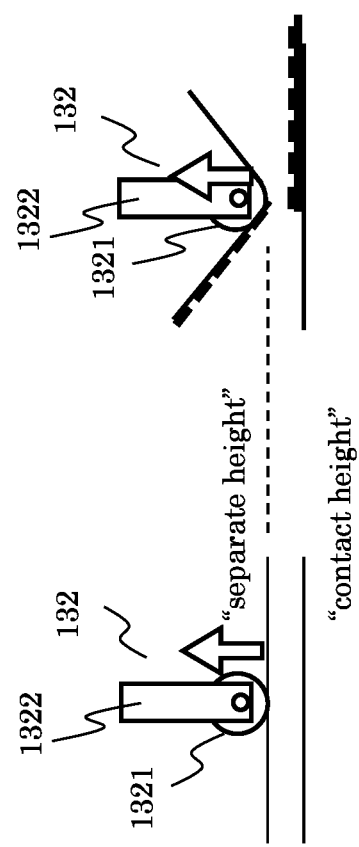
Fig. 7

(a) The first pattern of control by the height control mechanism, where the change from "contact height" to "separation height" is a vertically upward

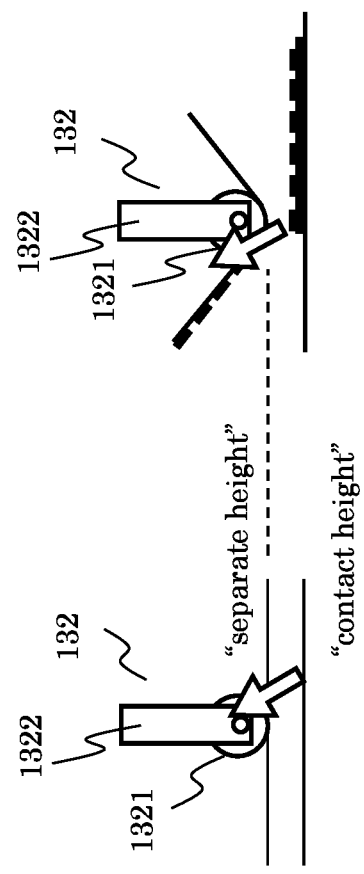

(b) The first pattern of control by the height control mechanism, where the change from "contact height" to "separation height" is forward oblique upper direction

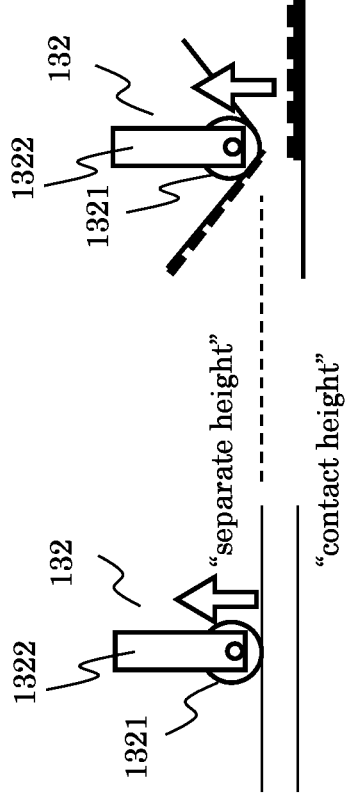

(c) The first pattern of control by the height control mechanism, where the change from "contact height" to "separation height" is backward oblique upper direction

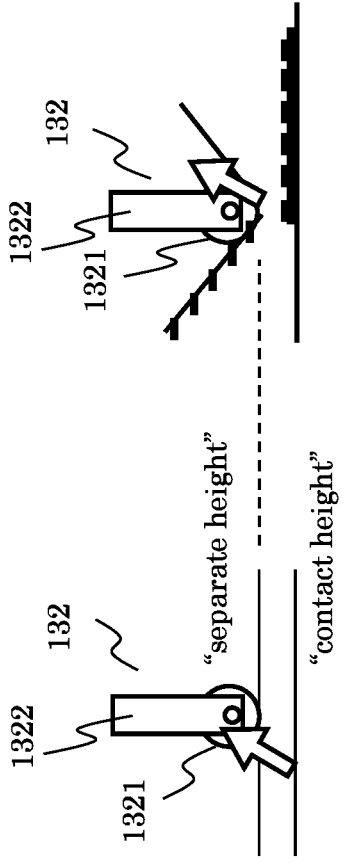

Fig.8

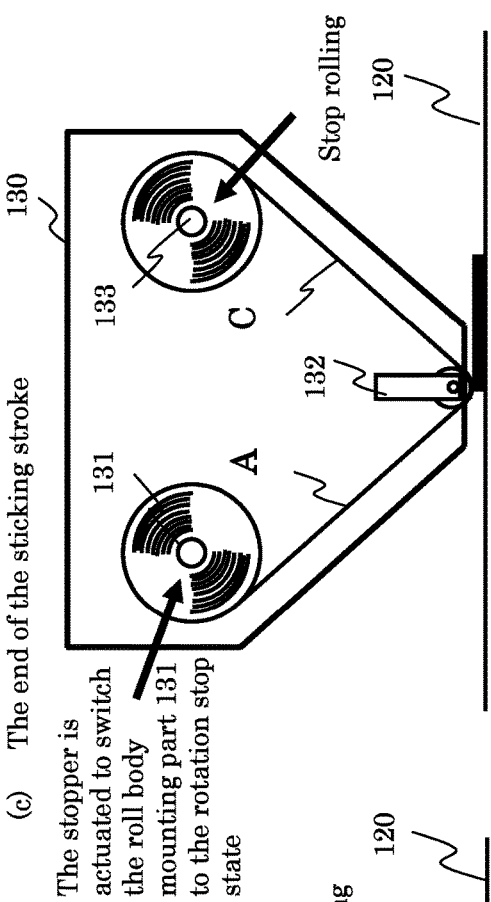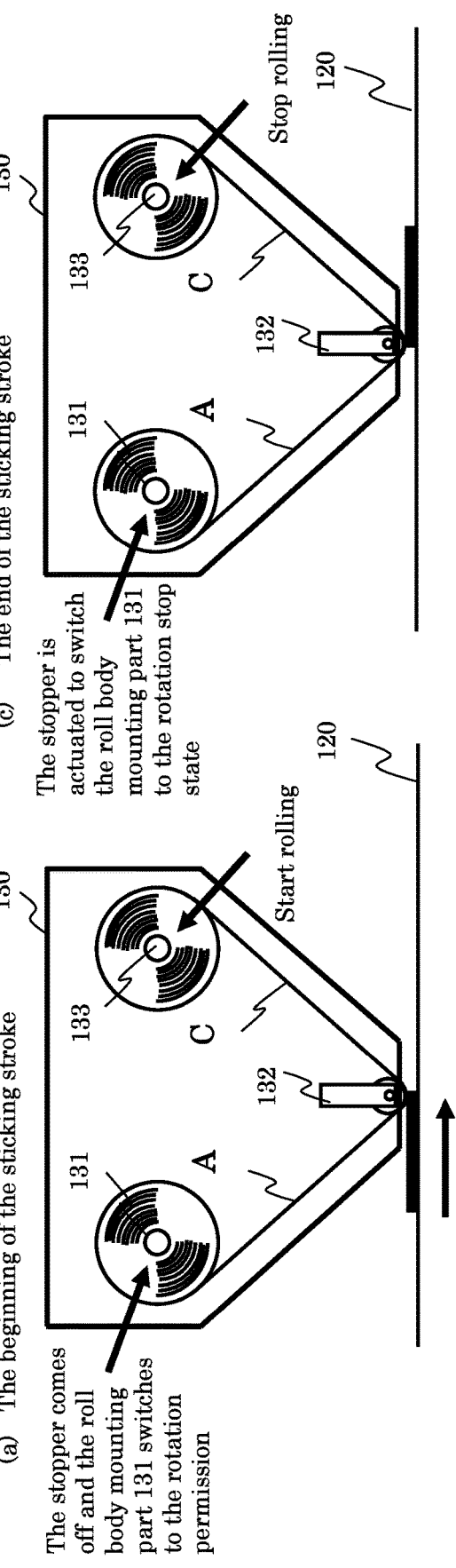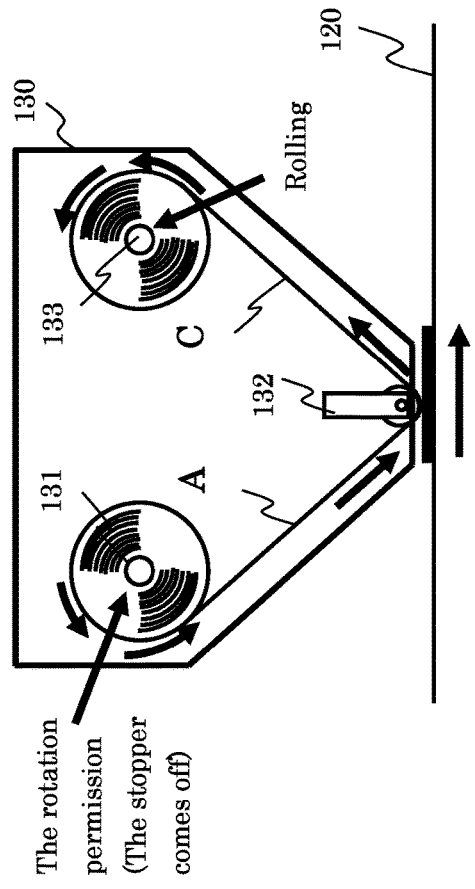
Fig.9

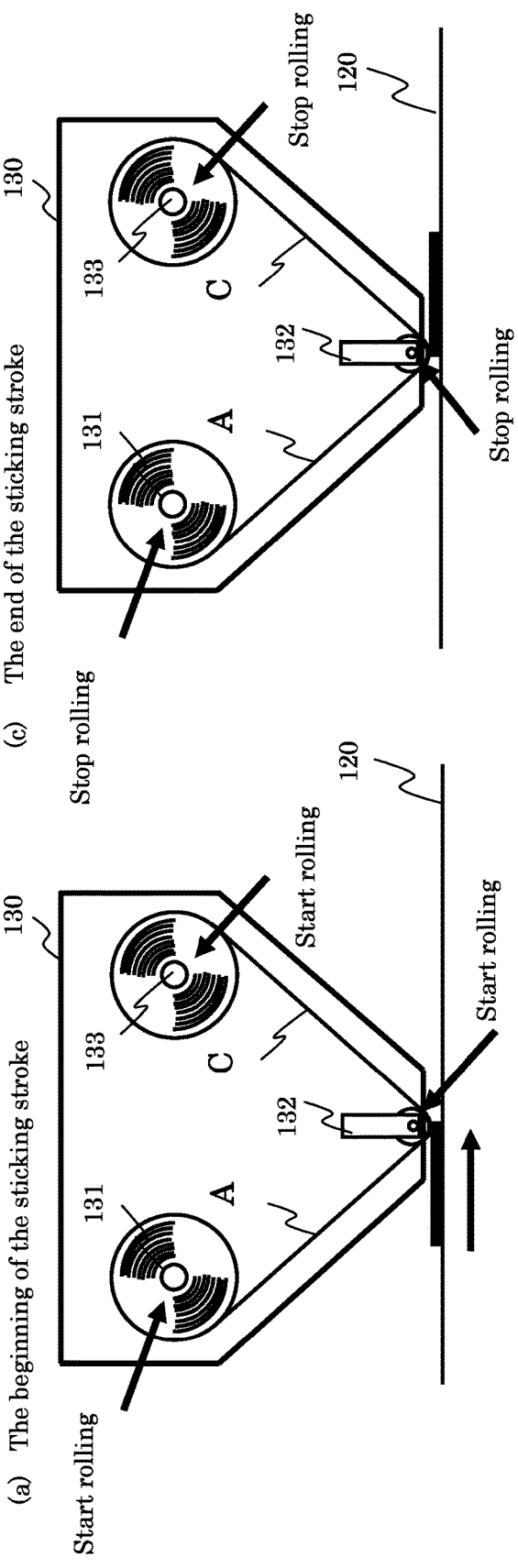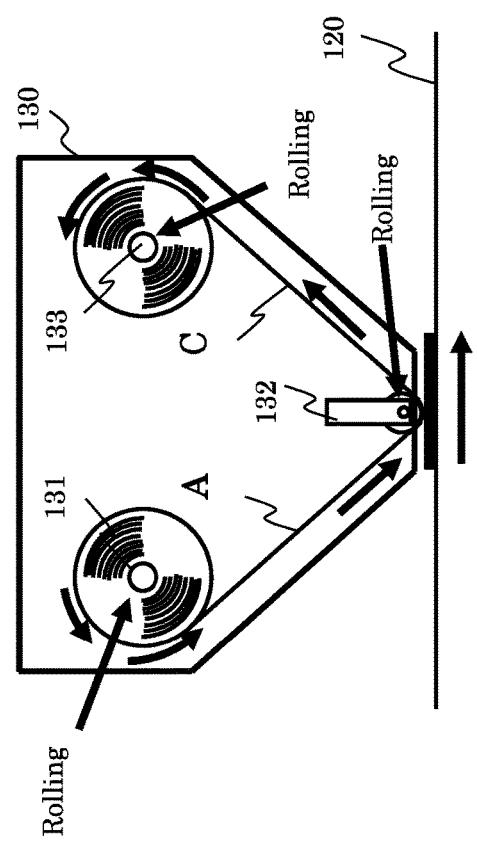
Fig.11

Conventional manufacturing method shown in Prior art JP2016-008682

STICKING APPARATUS

TECHNICAL FIELD

The present invention relates to a half-cut double-sided tape sticking apparatus. In a general double-sided tape, a tape, in which a base material and an adhesive layer provided on both surfaces of the base material are integrated in a belt shape, is continuous without a break. The surface is supported by the release paper before use. The "half-cut double-sided tape" is in a state in which the double-sided tape is properly cut, and the surface is in a state of being supported by the release paper before used. The sticking apparatus according to the present invention is a sticking apparatus that applies a half-cut double-sided tape to a first sticking object by rolling. The first sticking object and a second sticking object can be processed into a sticking state by pressing the second sticking object onto the first sticking object.

BACKGROUND TECHNOLOGY

Commercial packaging, commonly referred to as blister, has been used in a goods packaging. The blister is a plastic three-dimensional container with a cavity space generally conforming to the outline of the product to be packaged, and after the product is fitted into the cavity space, packaging is performed by sealing the opening with a mount or the like. In recent years, due to environmental concerns, less waste packaging is required. Among packaging methods, the importance of mount film packaging has increased. By the film packaging with the mount method, a commodity is packaged with a shrink film, and the shrink film-packaged commodity is stuck to the mount to be combined as one body. It should be noted that while the package of the commodity has been completed at the time of film wrapping, an additional step for combining the wrapped commodity with a hanging board for the hanging display may be required.

Shrink film packaging with a mount is a packaging method for hanging and displaying a shrink film-packaged commodity on a furniture surface, a storefront wall surface, or the like by hanging the commodity on a mount-by-mount basis, instead of placing the shrink film-packaged commodity in the fixture. A suspension method for hanging a package uses a hook. For example, a rod-like hook protrudes a hole having a diameter that is sized to receive a hook that is bored in the mount. The hole of the mount is passed through the hook and suspended, and the same kind of commodity packaging is suspended. Products of the same type can be efficiently hung into space. This display method is often used in a store such as a drug store.

A liquid adhesive may be applied to the mount, and the adhesive may be cured and stuck after the shrink film-packaged commodity is placed thereon, but there are other processes for applying the double-sided tape with the double-sided tape interposed therebetween. While the former requires a curing process of the adhesive, the latter is not necessary, so the latter is advantageous for mechanical automation.

The present invention includes applying a double-sided tape between a mount and a shrink film packaged product. Conventional double-sided tape is provided with adhesive layers on both sides of a substrate layer and are rolled such that one side is supported by a release paper tape. If a release agent is applied to both sides of the release paper, the release paper may be a single sheet to separate double-sided tape that is wound into a roll shape. Generally, the double-sided tape is provided in a rolled state in the market. The double-sided tape is interposed between the sticking object part and the sticking object to stick them together. But when sticking the double-sided tape to the sticking object, the double-sided tape is unreeled and cut at the length required for sticking. After the double-sided tape is stuck to the sticking object part from the adhesive layer on the side not covered with the release paper tape, the release paper tape should be peeled to expose the adhesive layer, and the sticking object is stuck to the adhesive layer appearing on the surface side.

Here, when conventional industrial use of the double-sided tape is considered, double-sided tape is continuous in length, so the cutting and the peeling of the release liner are required, and it is difficult to mechanically control the double-sided tape. A "half-cut double-sided tape" is known as a special double-sided tape in the prior art (for example, JP2016-008262). The half-cut double-sided tape has a strip-like shape in which a double-sided tape is appropriately cut across the tape feeding direction with an appropriately interval, and the surface of the double-sided tape is supported by the release liner before the use of the double-sided tape. That is, the double-sided tape part is cut into a large number in the width direction to form a strip, and the double-sided tape is held on the release liner surface before being used. For half-cut double-sided tape, since the tape is cut in a strip shape of a proper length from the beginning, the tape can stick without any cutting process when the tape is stuck directly to the place to be stuck or on the object to be stuck while being peeled off from the release liner. Therefore, it is convenient for automated application of the double-sided tape. In the case of the half-cut double-sided tape, since the peeling work of the release liner is performed simultaneously with sticking the double-sided tape to the sticking object place or the sticking object, the winding and collection of the used release liner is simplified.

Prior art 1: JP 2016-008262

DISCLOSURE OF THE INVENTION

Problem to be Solved by the Invention

Conventional half-cut double-sided tape does not have an appropriate device module that can be employed for automated packaging by applying a half-cut double-sided tape to a predetermined location of a target object. That is, the mount-backed film packaging is required to be applied to the automated and massive process in the packaging to large quantities of products. But there is no appropriate sticking apparatus for an automated process for sticking the half-cut double-sided tape. In particular, the high speed of the process in packaging is required to be applied to products to be mass-produced, but the conventional sticking apparatus for applying the conventional half-cut double-sided tape to a predetermined position of a predetermined object has been used in the prior art. There has not been an automatic machine capable of repeatedly performing the sticking process at a high speed with a high degree of accuracy.

It is an object of the present invention in view of the above problems to provide a sticking apparatus for applying a half-cut double-sided tape to the first sticking object by rolling automatically, and pressing the second sticking object, thereby processing both the first sticking object and the second sticking object into a sticking state automatically.

The sticking apparatus of the present invention has capability of high-speed automation processing of the mount film packaging.

Means for Solving the Problems

To achieve the above-mentioned object, the present invention of an automatic insertion device comprises the following configuration. The following configuration can be adopted in any combination as far as possible. Further, the technical features of the present invention are not limited to those described below, and it is to be understood that the technical features are recognized based on the concept of the invention, which can be understood by those skilled in the art from the description of the specification and drawings or the description thereof.

A sticking apparatus of the present invention for sticking a half-cut double-sided tape, which is half-cut into a large number of small pieces, from a release liner to a predetermined position of a first sticking object conveyed on a conveyor apparatus in a predetermined state, for mounting a second sticking object in a predetermined state with respect to the sticking predetermined position of the half-cut double-sided tape on the first sticking object, includes: a feeder device for supplying the first sticking object to the conveyor apparatus in the predetermined state; the conveyor apparatus conveying the first sticking object in the predetermined state; a half-cut double-sided tape sticking device including a roll body mounting part from which the release liner-equipped half-cut double-sided tape is delivered, a rotary sticking rolling part through which the release liner-equipped half-cut double-sided tape passes, and a release liner reel part for reeling the release liner that has passed through the rotary sticking rolling part; a second sticking operation apparatus for placing and pressing the second sticking object with respect to the sticking place of the half-cut double-sided tape on the first sticking object; wherein the rotary sticking rolling part includes a rotating body and a support mechanism for rotatably supporting the rotating body, wherein the support mechanism includes a height control mechanism for controlling a height for supporting the rotating body, wherein at least one of the roll body mounting part or the release liner reel part comprise an automatic rotation control mechanism to control rotation. With the above configuration, since either the roll body mounting part or the release liner reel part, or both the roll body mounting part and the release liner reel part are provided with an automatic rotation control mechanism, the half-cut double-sided tape can be deliberately reeled out, so that the half-cut double-sided tape can be lightly delivered, and the half-cut double-sided tape can be accurately stuck without deflection in the state of the half-cut double-sided tape.

The above-mentioned height control mechanism performs a control for switching the height of the release liner-equipped half-cut double-sided tape to a contact height at which the release liner-equipped half-cut double-sided tape contacts on the portion to be stuck and a separation height that is separated from the portion to be stuck.

Here, the automatic rotation control mechanism may have several combinations in view of the direction of travel of the release liner-equipped half-cut double-sided tape.

In the first combination, the release liner reel part is capable of rotational drive control, the roll body mounting part is capable of switching between permitting rotation and stopping rotation, both the release liner reel part and the rotary sticking rolling part are controlled cooperating with each other, and the rotary sticking rolling part is rotated in a driven manner. In this combination, the release liner reel part performs the rotary drive control, and the roll body sticking part repeats permitting rotation and stopping rotation linked with each other, so that the half-cut double-sided tape can be lightly delivered, and high-speed sticking can be managed.

In the second combination, the release liner reel part and the roll body sticking part are capable of controlling rotational drive, with both the release liner reel part and the roll body sticking part being controlled in combination with each other, and the rotary sticking mounting part is rotated in a driven manner. In this combination, by repeating a predetermined amount of rotations in conjunction with the release liner reel part and the roll body sticking part, the half-cut double-sided tape can be lightly delivered, and a high-speed sticking can be dealt with.

The third combination is one in which the release liner reel part, the rotary sticking rolling part, and the roll body mounting part are capable of controlling rotational drive; further, the release liner reel part, the rotary sticking rolling part, and the roll body mounting part are controlled cooperating with each other. In this combination, by repeating a predetermined amount of rotation in conjunction with the release liner reel part, the rotary sticking rolling part, and the roll body mounting part, the half-cut double-sided tape can be lightly delivered out, and a high-speed sticking can be managed.

Here, the support mechanism may be configured with the height control mechanism that controls the height at which the rotating body is supported. The height control mechanism controls the height of the rotating body. In the application of the release liner-equipped half-cut double-sided tape through the rotary sticking rolling part, the sticking control is performed to switch to the "contact height" contacting the surface of the sticking object part and the "separation height" separated from the surface of the sticking object part. Since the release liner-equipped half-cut double-sided tape of the present invention is originally cut for each small piece, the release liner-equipped half-cut double-sided tape can be pulled apart when the height of the rotating body is maintained at the "contact height" and the release liner-equipped half-cut double-sided tape is attached to the sticking target site via the rotary sticking rolling part, and then the half-cut double-sided tape sticking apparatus itself is pulled apart upward. That is, it is not necessary to newly cut with a cutter or the like, and the sticking stroke can be finished.

Here, variations from the "contact height" to the "separation height" may be controlled by the height control mechanism. The control may be with regard to vertical upward movement. However, it is the simplest operation of pulling the half-cut double-sided tape sticking apparatus upward from the sticking point from its present position. Another aspect of control is the forward upward movement of the stuck half-cut double-sided tape, i.e., forward pulling operation. Since the release liner-equipped half-cut double-sided tape is originally cut into small pieces, the release liner-equipped half-cut double-sided tape is pulled obliquely forward, leaving the stuck half-cut double-sided tape of each piece stuck to the application site. While the ends of the stuck half-cut double-sided tape at the boundary of the attachment point attempt to follow diagonally forward, the friction between the release liner and the stuck half-cut double-sided tape is very small and remains at the attachment point after being peeled from the sticking apparatus.

Another aspect of control is the rearward upward movement of the stuck half-cut double-sided tape, i.e., reverse pulling operation. Since the release liner-equipped half-cut double-sided tape is originally cut into small pieces, the release liner-equipped half-cut double-sided tape is pulled obliquely backward, leaving the stuck half-cut double-sided tape of each piece stuck to the application site. While the ends of the stuck half-cut double-sided tape at the border of the attachment point attempt to follow diagonally backward, the friction between the release liner and the stuck half-cut double-sided tape is very small and remains at the stuck point after being peeled from the sticking apparatus.

There may be a variety of objects to be handled by the sticking apparatus. For example, the first sticking object supplied from the feeder device may be a mount, and the second sticking object supplied from the second sticking operation apparatus may be a shrink-wrapped body to be packaged. This first pattern is that the sticking operation is executed with regard to the mount that is easy to transport while being conveyed on the conveyor apparatus. For example, the first sticking object supplied from the feeder device is a shrink-wrapped body to be packaged, and the second sticking object supplied from the second sticking operation apparatus is the mount. This second pattern is that the sticking operation is executed with regard to the shrink wrap package object which is a flat and easy-to-transport object while being conveyed on the conveyor apparatus. It is also possible to provide a picking device that picks and collects the abovementioned combined objects from the conveyor apparatus, which the combined object consists of the first sticking object and the second sticking object stuck each other.

Further, it is also possible to control the cooperating of the providing operation of the release liner-equipped half-cut double-sided tape of the roll body mounting part and the sticking operation of the rotary sticking rolling part. First, the roll body mounting part is provided with the automatic rotation control mechanism to control the rotation of the release liner-equipped half-cut double-sided tape. There may be a configuration in which the roll body mounting part is rotated following the delivery of the release liner-equipped half-cut double-sided tape. Here the roll body mounting part controls the drive for the delivery of the release liner-equipped half-cut double-sided tape itself by the drive actuator, such as a motor, actively controlling its rotation. In this pattern, for each sticking stroke of the release liner-equipped half-cut double-sided tape, the cooperating of the delivery operation of the release liner-equipped half-cut double-sided tape of the roll body mounting part and the sticking operation of the rotary sticking rolling part is controlled.

For example, in the beginning of the sticking stroke, the rotating start of the rotating body by the rotary control of the roll body mounting part and the movement of the transition from the "separation height" to the "contact height" of the rotating body in the rotation control by height control mechanism of the rotary sticking rolling part is linked. Further, at the end of the sticking stroke, the rotating stop of the rotating body by the rotary control of the roll body mounting part and the movement of the transition from the "contact height" to the "separation height" of the rotating body in the rotation control by height control mechanism of the rotary sticking rolling part is linked. Thus, since the rotation control of the roll body mounting part is actively performed, the release liner-equipped half-cut double-sided tape is not excessively delivered by the rotational moment of the roll body mounting part at the end of the sticking stroke, and a good delivery state can be maintained. Also, since the height control of the rotating body by the height control mechanism of the rotary sticking rolling part is linked, the loosening or deflection of the release liner-equipped half-cut double-sided tape due to the variation of the height of the rotating body does not occur, and a good delivery state can be maintained.

As described above, the control includes the active switching control from contact height" to the "separation height" by the height control of the rotating body in the height control mechanism of the rotary sticking rolling part, as well as control regarding the unevenness of the surface body to be stuck at the "contact height". That is, the "suspension movement mechanism" can follow the unevenness of the surface body to be stuck. By providing the "suspension movement mechanism" in the height control mechanism in the support mechanism of the rotary sticking rolling part, the surface body to be stuck is not limited so as to be always flat, and it is possible to stick the tape to the three-dimensional object. It is also possible for the suspension movement mechanism to be an elastic body (e.g., a material having a large elastic force such as a rubber material, a silicone material and a sponge material) provided with the rotating body. The suspension movement mechanism can also be a vertically oscillating swing mechanism with a support mechanism (e.g., such as a suspension mechanism of the tire of the vehicle).

It is also possible to have a "steering motion mechanism" that changes the angle within the horizontal plane of the rotating body. A "steering motion mechanism" incorporates a pivoting mechanism that can alter the angle of the rotating body within the horizontal plane in the support mechanism of the rotary sticking rolling part. In addition, a turning mechanism that can change an angle in a horizontal plane is incorporated into a robot arm that supports the entire half-cut double-sided tape sticking apparatus, and the entire half-cut double-sided tape apparatus changes the angle within a horizontal plane. Here, the rotating body of the rotary sticking rolling part may be a single rotating body or a pair of left and right rotating bodies.

According to the above configuration, a conventional rotary sticking rolling part is a simple roller of capable of fixed rotation about an axis, the rotary sticking rolling part of the present invention is provided with a steering movement mechanism to change an angle in a horizontal plane and the suspension movement mechanism for vertically swinging, and the trace drawn by this rotary sticking rolling part can be curved and upper and lower movement and can be a so-called three-dimensional tracking. A pair of left and right rotating bodies can draw a trajectory, such as a car tire trajectory. The small pieces of half-cut double-sided tape are stuck onto the three-dimensional surface with respect to the object to be stuck according to the three-dimensional tracking of the rotary sticking rolling part.

Effects of the Invention

According to the present invention of the half-cut double-sided tape sticking apparatus, since either the roll body mounting part or the release liner reel part, or both the roll body mounting part and the release liner reel part employs an automatic rotation control mechanism, the half-cut double-sided tape can be lightly reeled out, so that the half-cut double-sided tape can be lightly fed, and the half-cut double-sided tape can be accurately stuck without deflection in the sticking state of the half-cut double-sided tape. The trajectory drawn by the rotary sticking part can be a curve in a horizontal plane and be a so-called three-dimensional trajectory by curving up and down. The small pieces of half-cut double-sided tape are transferred onto the three-dimensional trajectory with respect to the object to be sticked in the three-dimensional trajectory of the rotary sticking part.

BRIEF DESCRIPTION OF THE DRAWINGS

FIG. 7 (a)-(b) are schematic views showing the movement of the support mechanism 1322 in a very simple manner.

FIG. 8 (a)-(c) are diagrams showing three patterns of the sticking control by the height control mechanism.

FIG. 9 (a)-(c) are drawings showing the automatic rotation control mechanism according to a first pattern.

FIG. 11 (a)-(c) are drawings showing the automatic rotation control mechanism according to a third pattern.

DETAILED DESCRIPTION OF THE PREFERRED EMBODIMENT

Some Embodiments of a sticking apparatus according to the present invention are described below with reference to the relevant drawing. Needless to add, the claims of the present invention include but are not limited to the application, configuration, or quantity shown in the following Embodiments.

Embodiment 1

The sticking apparatus for sticking the half-cut double-sided tape according to the Embodiment 1 of the present invention is described below. In the following description, the feeding direction and winding direction of the double-sided tape with release liner is "length direction" and the direction orthogonal to the longitudinal direction is the "width direction". The length direction of each half-cut strip corresponds to that of the half-cut double-sided tape. The width direction of each half-cut strip corresponds to that of the half-cut double-sided tape. Further, the sign of the release liner-equipped half-cut double-sided tape described as "A", the sign of the half-cut double-sided tape is described as "B", and the sign of the release liner is described as "C". That is, the state in which the "half-cut double-sided tape B" is supported by the "release liner C" becomes the "the release liner-equipped half-cut double-sided tape A".

Figure 1:
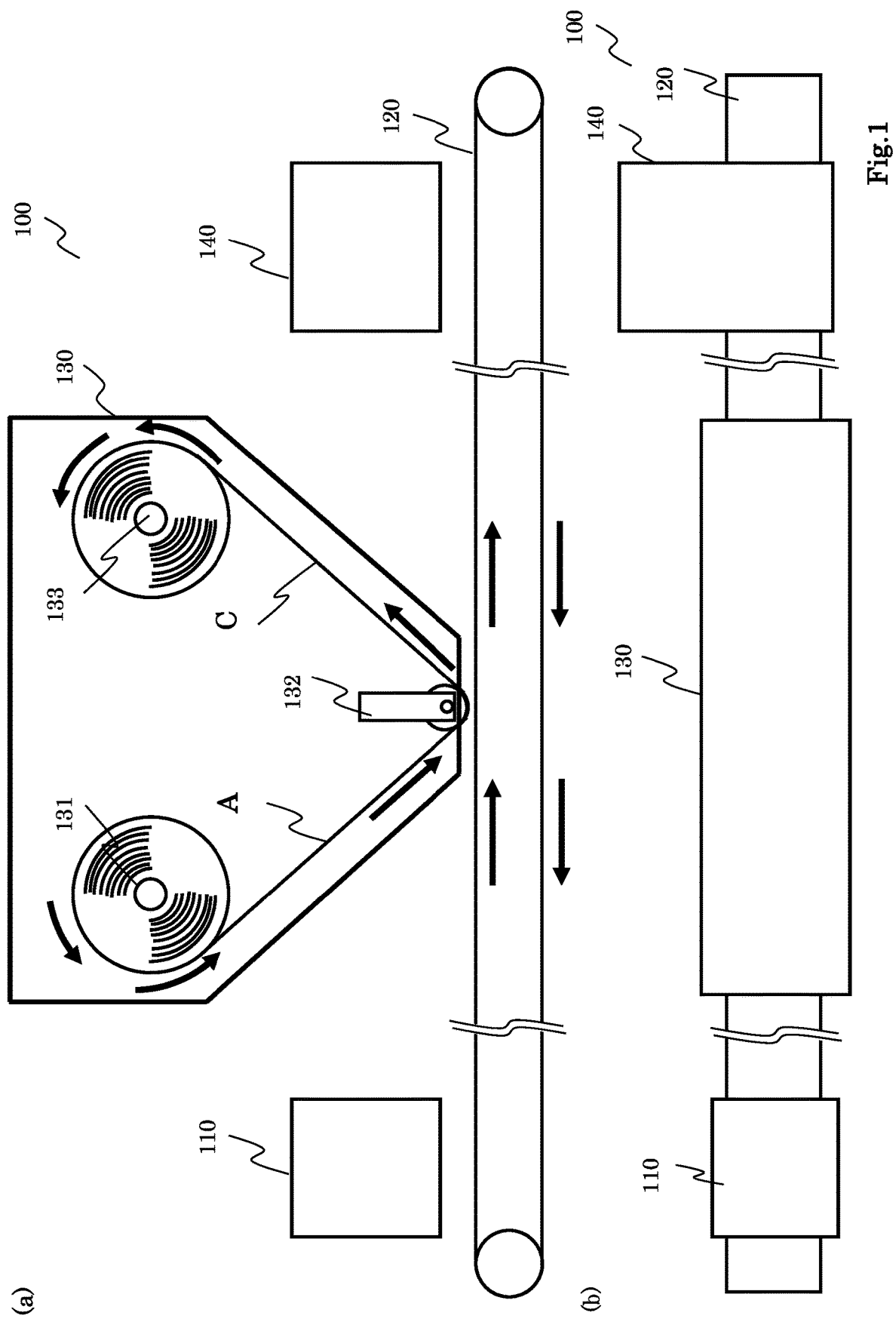
FIG. 1 (a)-(b) are schematic views showing a configuration of the sticking apparatus 100 of the half-cut double-sided tape according to the present invention.

FIG. 1 is a drawing schematically showing a configuration of a sticking apparatus 100 of a half-cut double-sided tape according to the present invention. FIG. 1 (a) shows the configuration of the sticking apparatus 100 of the half-cut double-sided tape viewed from the side, and FIG. 1 (b) shows the plane configuration of the sticking apparatus 100 of the half-cut double-sided tape as viewed from above. As shown in FIG. 1 (a), the sticking apparatus 100 according to Embodiment 1 comprises the feeder apparatus 110, the conveyor apparatus 120, the half-cut double-sided tape sticking device 130, and the second sticking operation apparatus 140 for carrying the second sticking object. In this Embodiment 1, the first sticking object 200 set in the feeder device 110 is a mount, and the second sticking object 300 set in the second sticking operation apparatus 140 for carrying the second sticking object is an example of a shrink-wrapped commodity. It should be noted that the size and structure of each part of the apparatus is not limited. In particular, although the feeder device 110 and the second sticking operation apparatus 140 for the second sticking object are merely rectangular, it is merely an indication that it is located near the conveyor apparatus 120 and is not an actual construction example. It should be noted that although the length direction is drawn by omitting part of the conveyor apparatus 120 and the half-cut double-sided tape sticking device 130 is drawn relatively large relative to the conveyor apparatus 120, the relationship and the actual ratio is not shown. The length and width of the conveyor apparatus 120 is an example and is not limited. Also, the ratio of the length and width of the conveyor apparatus 120, those of the feeder 110 and those of the second sticking operation apparatus 140 are not limited.

The configuration of each part of the stitching apparatus will be explained. The feeder device 110 is a device that supplies the first sticking object 200 to the conveyor apparatus 120 in a predetermined manner. The structure of the feeder device 110 itself is not limited, but may vary depending on the shape, size, etc. of the provided first application object 300. The first configuration of the feeder device 110 includes a stacker and a number of mounts, which are the first sticking object 200, that are set in the stacker. The mount can be sequentially provided one by one onto the conveyor apparatus 120. The second configuration of the feeder device 110 includes a supply device that supplies the mount to the feeder device 110 one by one. The feeder device 110 may receive and transfer the mounts one by one from the supply device onto the conveyor apparatus 120.

The conveyor apparatus 120 is a device that runs the belt by means of an endless track. In this example, the feeding destination of the first sticking object 200 by the feeder device 110 is the conveyor apparatus 120. The conveyor apparatus 120 conveys the supplied first sticking object 200 in a predetermined attitude. There is a half-cut double-sided tape sticking device 130 in the way of the conveyance path. The half-cut double-sided tape B is attached to the first sticking object 200. Further, the second sticking operation apparatus 140 for the second sticking object is located, the second sticking object 300 is mounted on the first sticking object 200. After mounting the second sticking object 300, the first sticking object 200 and the second sticking object 300 are integrated by sticking A configuration for installing the picking collect device (not shown) for collecting integrated body of the second sticking object 300 and the first sticking object 200 from the conveyor apparatus 120 is also possible.

The half-cut double-sided tape sticking device 130 comprises the roll body mounting part 131, the rotary sticking rolling part 132, and the release liner reel part 133.

The roll body mounting part 131 rotatably supports the release liner-equipped half-cut double-sided tape A. As the so-called reel delivery device, the release liner-equipped half-cut double-sided tape A is delivered. The release liner-equipped half-cut double-sided tape A is rolled into a roll shape and is provided to the roll body mounting part 131 of the half-cut double-sided tape sticking device 130.

The rotary sticking rolling part 132 is a member in which the release liner-equipped half-cut double-sided tape A delivered from the roll body mounting part 131 passes through the outer surface of the rotary sticking rolling part 132. The half-cut double-sided tape 100 B, which is half-cut into a large number of small pieces, are stuck and pressed to a predetermined position of the first sticking object 200 by rotating and pressing while being in contact with the first sticking object 200. If the surface of the part to be adhered is of such a physical property as to strongly adhere to the adhesive layer, the half-cut double-sided tape 100 B is peeled and shifted from the release liner C to the first sticking object 200 at the same time as the half-cut double-sided tape 100 B is stuck. After shifting and sticking, the release liner C is reeled and collected in the release liner reel part 133.

The release liner reel part 133 reels the release liner C remaining after passing through the rotary sticking rolling part 132. The release liner C is wound and collected by rotating, as in the so-called reel take-up device.

The second sticking operation apparatus 140 for the second sticking object is an apparatus for placing and pressing the second sticking object against the stuck part of the half-cut double-sided tape on the first sticking object. The structure itself of the second sticking operation apparatus 140 of the second sticking object is not limited but may depend on the shape and size of the second sticking object 300 to be stuck. In this example, the second sticking object 300 is a shrink-wrapped product. It should be noted that the feeding method of the second sticking object 300 to the second sticking operation apparatus 140 of the second sticking object may be not limited. For example, an apparatus including a stacker and supplying a plurality of second sticking objects 300 in advance into the stacker may be employed, and an apparatus including a conveyor carrying the second sticking object connected to the second sticking operation apparatus 140 in a front stage from which the shrink-wrapped commodity flows as the second sticking object 300 may be employed. For example, the second sticking operation apparatus 140 of the second sticking object may include a movable grip part 141 for gripping and moving or lifting the second sticking object 300. With the movable grip part 141, the second sticking object 300 may be near the conveyance path of the conveyor apparatus 120. The movable grip part 141 can grasp and raise the second sticking object 300 and move the second sticking object 300 onto the conveyor apparatus 120 and lower and press the first sticking object 200 on the conveyor apparatus 120 as it is.

Figure 2:
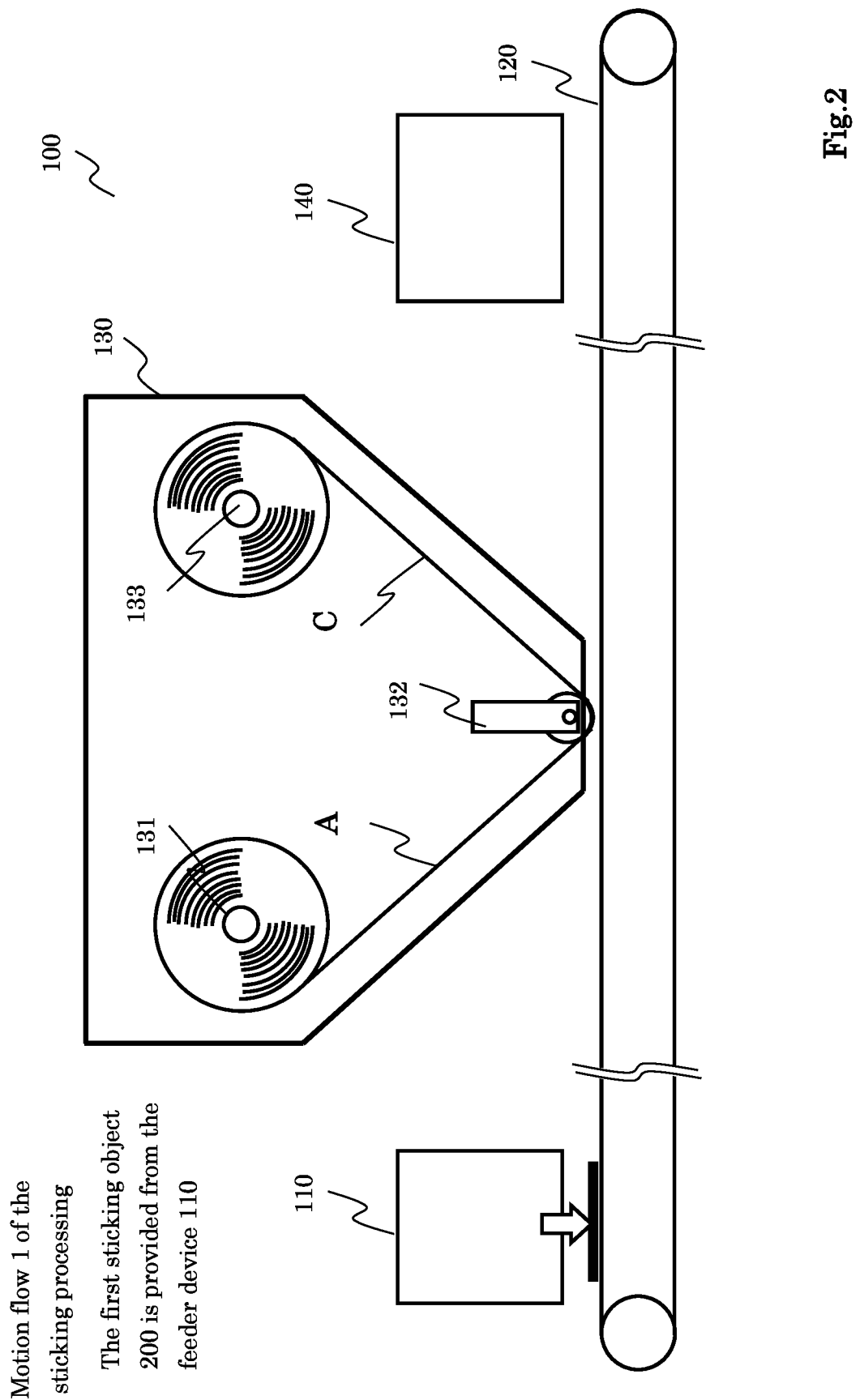
FIG. 2 is a schematic view of the overall motion flow (part 1) of the sticking apparatus 100 of the present invention according to Embodiment 1.

The following is an example description of the overall motion of the sticking apparatus 100 of the present invention according to Embodiment 1. FIGS. 2-6 are schematic views of the overall motion flow of the sticking apparatus 100 of the present invention according to Embodiment 1. First, as shown in FIG. 2, a first sticking object 200 is provided from the feeder device 110 to the conveyance path on the conveyor device 120. During this motion, the conveyor device 120 may be constantly moving or may be intermittently moving in a manner controlled to occasionally stop temporarily.

Figure 3:
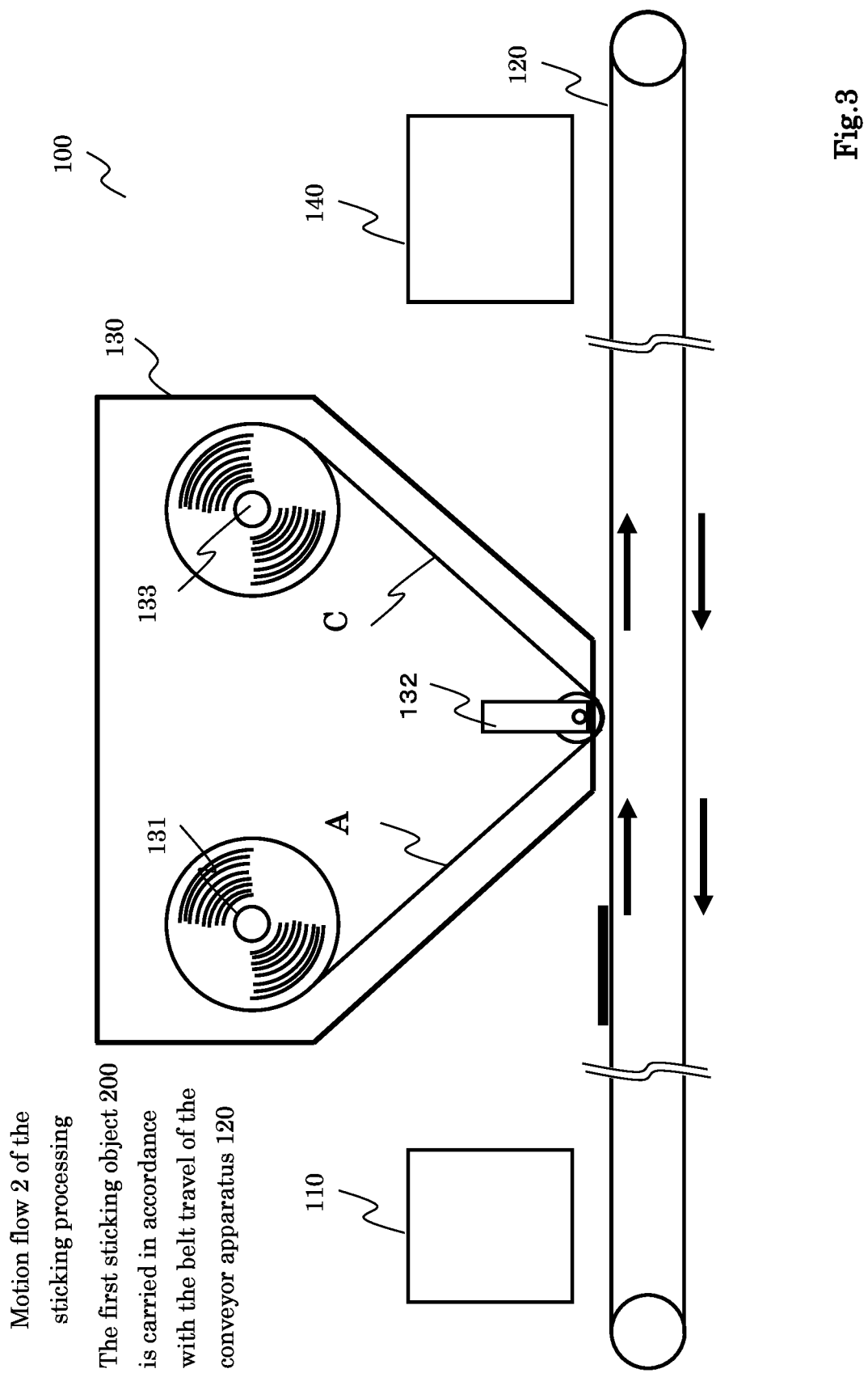
FIG. 3 is a schematic view of the overall motion flow (part 2) of the sticking apparatus 100 of the present invention according to Embodiment 1.
Figure 4:
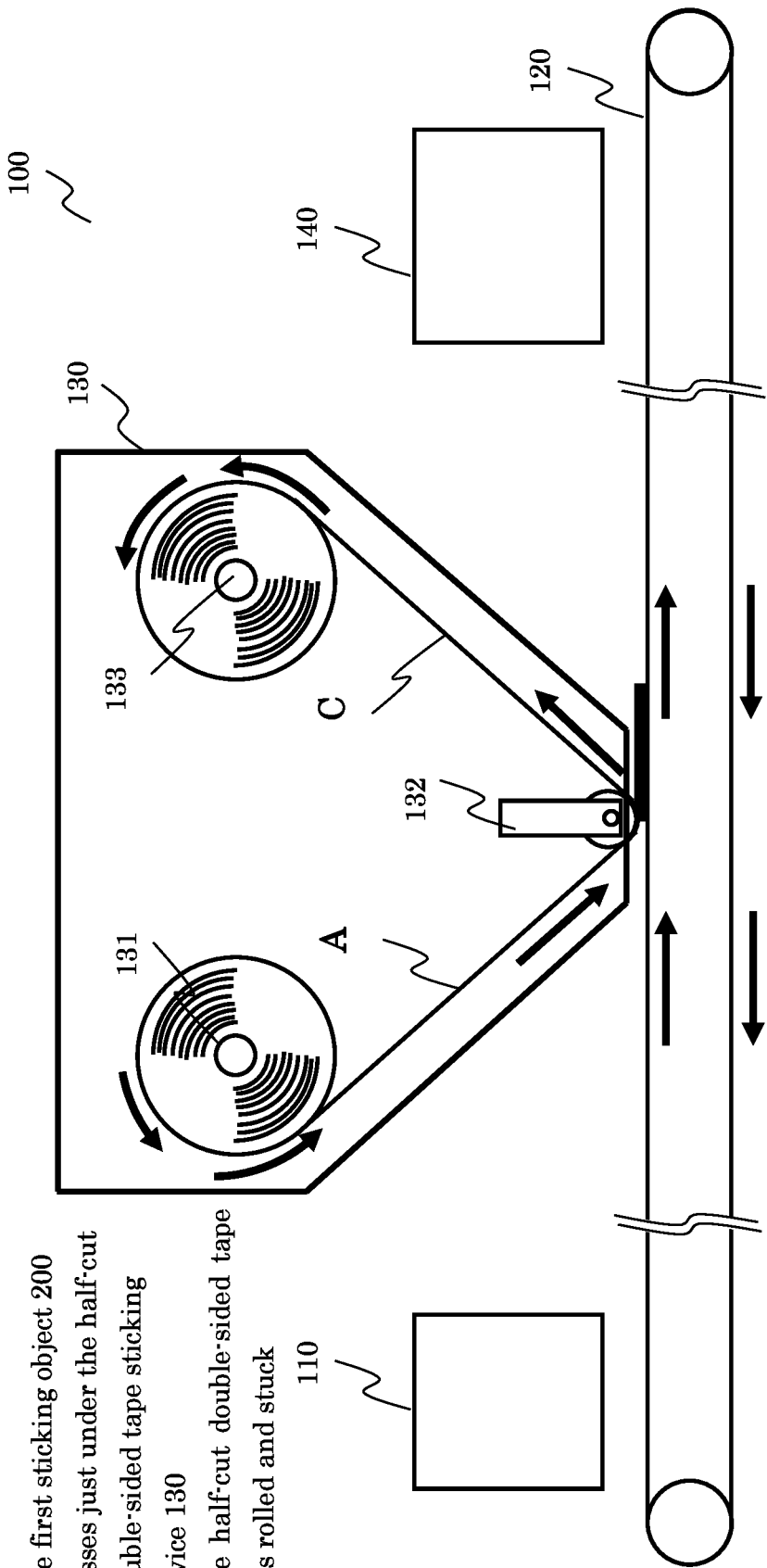
FIG. 4 is a schematic view of the overall motion flow (part 3) of the sticking apparatus 100 of the present invention according to Embodiment 1.

Next, as shown in FIG. 3, the first sticking object 200 is carried in accordance with the belt travel of the conveyor apparatus 120. Here, as shown in FIG. 4, the first sticking object 200 passes just under the half-cut double-sided tape sticking device 130, but at that time, the height of the rotary sticking rolling part 132 is controlled with respect to the first sticking object 200 conveyed in a predetermined manner on the conveyor device 120, and the half-cut double-sided tape A on the outer surface of the rotary sticking rolling part 132 is brought into contact with the predetermined part of the first sticking object 200, and thereby the half-cut double-sided tape B is rolled and stuck. The movement of the half-cut double-sided tape sticking device 130 during the application process of FIG. 4 will be described in detail later.

Figure 5:
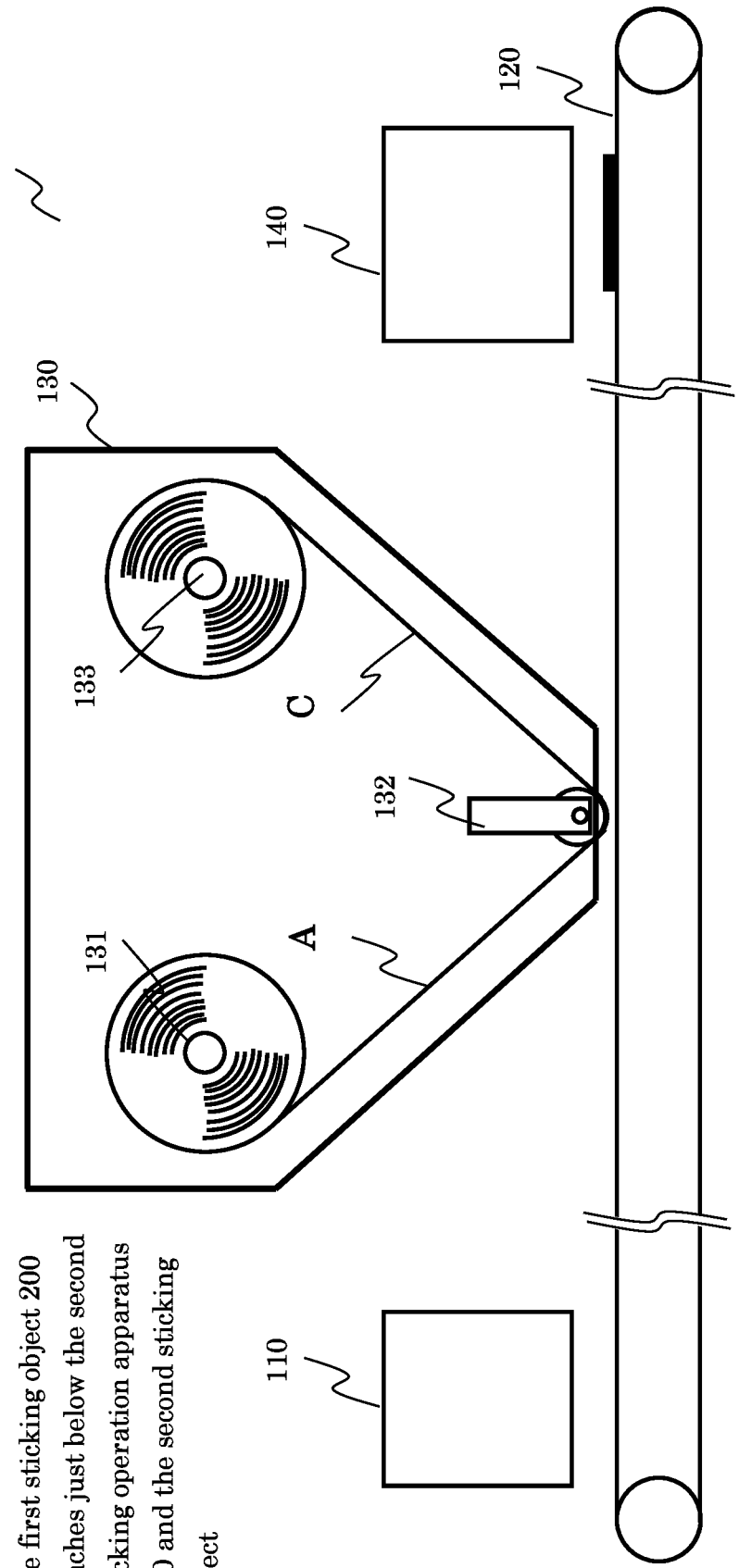
FIG. 5 is a schematic view of the overall motion flow (part 4) of the sticking apparatus 100 of the present invention according to Embodiment 1.
Figure 6:
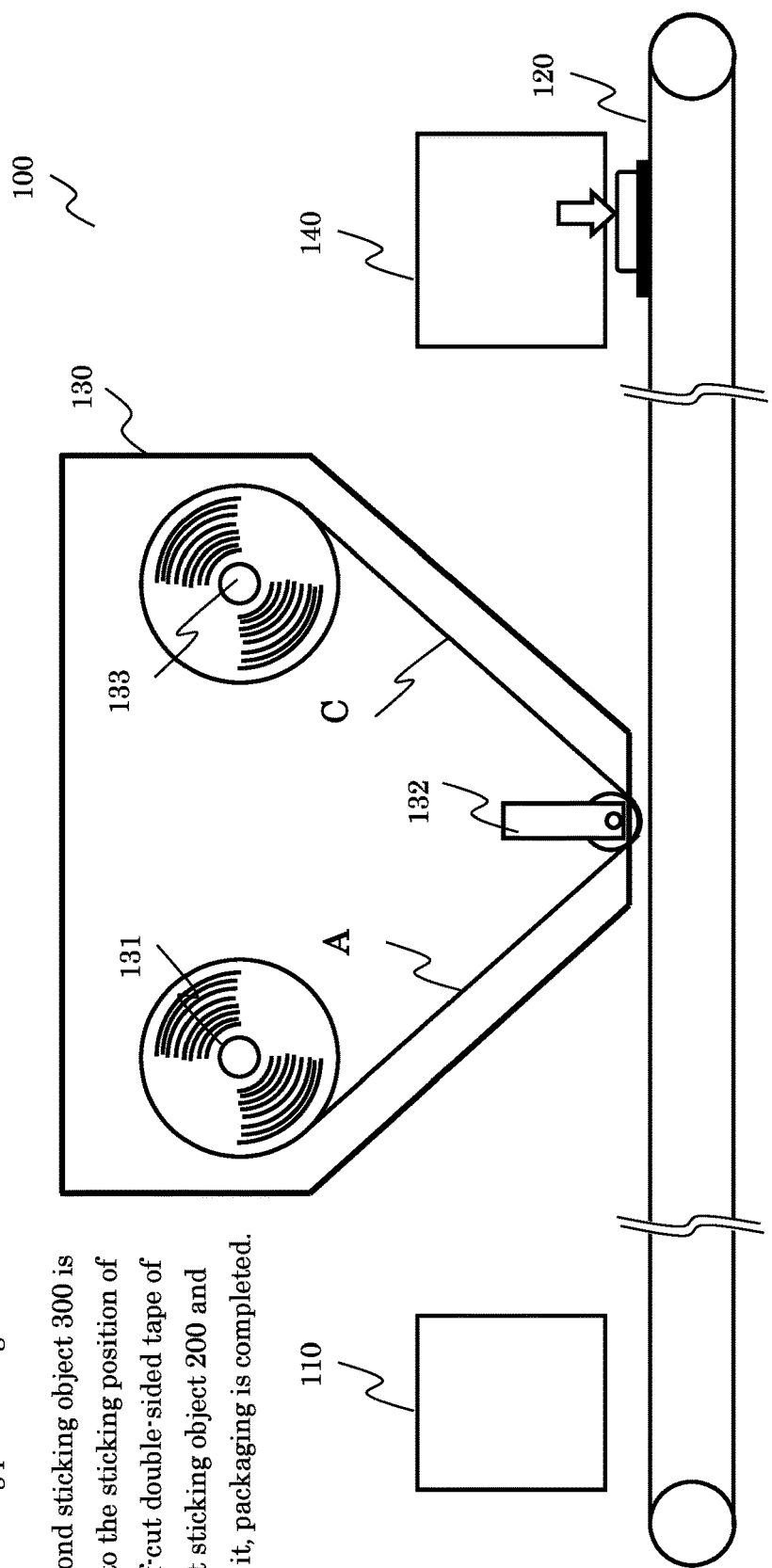
FIG. 6 is a schematic view of the overall motion flow (part 5) of the sticking apparatus 100 of the present invention according to Embodiment 1.

After FIG. 4, as shown in FIG. 5, the first sticking object 200 reaches just below the second sticking operation apparatus 140 and the second sticking object. The flow from FIG. 3 to FIG. 5 is actually capable of high-speed operation of the half-cut double-sided tape B to the first sticking object 200 by conveying the conveyor apparatus 120 at once without temporarily stopping. Next, as shown in FIG. 6, the second sticking operation apparatus 140 of the second sticking object places the second sticking object 300 in a predetermined state with respect to the sticking position of the half-cut double-sided tape of the first sticking object 200 and presses it. As a result, both the first sticking object 200 and the second sticking object 300 become stuck together. This is a schematic of the overall motion of the sticking apparatus 100 of the present invention according to Embodiment 1.

Next, the sticking process of the half-cut double-sided tape B to the first sticking object 200 shown in FIG. 4 is described in detail among the motions of the sticking apparatus 100 of the present invention. The rotary sticking rolling part 132 is configured to include a rotating body 1321 and a support mechanism 1322 that rotatably supports the rotating body 1321.

FIG. 7 is a very simple illustration of the motion of the support mechanism 1322. In FIG. 7, only some of the features of the entire support mechanism 1322 are shown around the rotary sticking rolling part 132. The support mechanism 1322 of the half-cut double-sided tape sticking device 130 is provided with a height control mechanism (not shown) that controls the support height of the rotary sticking part 132. This height control mechanism is a mechanism for controlling the height of the rotating body 1321 of the rotary sticking rolling part 132. In the rotary sticking rolling part 132, the mechanism performs a sticking control for switching between the "contact height", which is the height at which the release liner-equipped half-cut double-sided tape A is in contact with the part to be stuck, and the "separation height", which is the height at which the release liner-equipped half-cut double-sided tape A is separated from the part to be contacted. In FIG. 7, an example in which FIG. 7 (*a*) has lowered the rotary sticking rolling part 132 to a position of "contact height", and FIG. 7 (*b*) shows an example in which the rotary sticking rolling part 132 is raised to a "separation height" position.

In the sticking stroke, while the height of the rotating body 1321 is maintained at the "contact height" between "start of sticking" to "sticking period" by the height control mechanism, the height of the rotating body 1321 is raised to the "separation height" by the height control mechanism in the end of the "sticking period". As shown in FIG. 11, when the height of the rotating body 1321 is raised to the "separation height" by the height control mechanism, the release liner-equipped half-cut double-sided tape remaining on the release liner is left as it is, but the half-cut double-sided tape already stuck to the surface on the sticking object remains attached to the sticking target part, and these are separated from the release liner. Thus, the half-cut double-sided tape itself is an independent half-cut double-sided tape piece and is independent on the surface of the sticking object part after stuck. When the half-cut double-sided tape is applied to the part to be stuck by a desired length, the sticking apparatus 100 is pulled up as it is, so that each of the stuck half-cut double-sided tape pieces, which are in an independent state, remains on the surface of the part to be attached as it is.

The lift angle of the height control of the rotating body 1321 by the height control mechanism can also be devised. As described above, the height control mechanism performs the sticking control for switching the height of the rotating body 1321 to the "contact height" in which the height of the rotating body 1321 contacts on the sticking target and the "separation height" that is separated from the sticking target. However, in switching between the "contact height" and the "separation height", the height control mechanism pulls the rotating body 1321 upward, but there may be some patterns of lift angle. Shown in FIG. 8 (*a*) is the first pattern of application control by the height control mechanism, where the change from "contact height" to "separation height" is a vertically upward pattern. This is already mentioned above.

Next, shown in FIG. 8 (*b*) is the second pattern of application control by the height control mechanism, and the change from the "contact height" to the "separation height" is the forward oblique upper direction of the stuck half-cut double-sided tape. It is so-called forward pulling operation. Since the half-cut double-sided tape with release liner is originally cut into small pieces, the end of the half-cut double-sided tape with release liner at the boundary of the stuck point may follow diagonally forward when pulled up obliquely forward while leaving the half-cut double-sided tape affixed to the sticking site. However, the friction between the half-cut double-sided tape and the release liner is very small, so it remains at the sticking point after being peeled from the release liner, as shown in FIG. 8 (*b*).

Next, shown in FIG. 8 (*c*) is the third pattern of application control by the height control mechanism, and the change from the "contact height" to the "separation height" is the backward oblique upper direction of the stuck half-cut double-sided tape. It is so-called backward pulling operation. As described above, since the half-cut double-sided tape with release liner is originally cut into small pieces, the half-cut double-sided tape is pulled backward obliquely, leaving the half-cut double-sided tape affixed to the sticking site. The friction between the half-cut double-sided tape and the release liner is very small, the end of the half-cut double-sided tape with release liner at the boundary of the stuck point may follow diagonally forward when pulled up obliquely backward while leaving the half-cut double-sided tape affixed to the sticking site. However, the friction between the half-cut double-sided tape and the release liner is very small, so it remains at the sticking point after being peeled from the release liner, as shown in FIG. 8 (*c*).

As described above, the sticking apparatus 100 repeats a stroke in which the release liner-equipped half-cut double-sided tape A is used to stick the half-cut double-sided tape B when the object to be stuck traveling relatively one after another comes directly below. For example, when the moving object to be applied comes directly below, the height of the rotating body 1321 is set to the "contact height" to apply the half-cut double-sided tape, the "sticking period" in which the object to be stuck is relatively moved over a predetermined length to stick the half-cut double-sided tape, and the sticking of the predetermined length is completed. The "end of sticking", the height control mechanism pulls up the height of the rotating body 1321 upward so as to be the "separation height", is shifted to the "sticking preparation" which waits for the next sticking object to travel. Thus, the sticking stroke is repeated with the processes from "sticking start", "sticking period", "sticking end" to "sticking preparation" as one stroke.

A contrivance for the automatic rotation control is described in this sticking stroke. The cooperation of the control for the delivery operation of the release liner-equipped half-cut double-sided tape of the roll body mounting part and the sticking operation of the rotary sticking rolling part is secured. The automatic rotation control mechanism can be employed among the roll body mounting part 131, the rotary sticking rolling part 132 and the release liner reel part 133, or a combination thereof, and the delivery control of the release liner-equipped half-cut double-sided tape can be performed by these components. By installing the automatic rotation control mechanism, the control of the start of the rotary driving and the control of the support height of the rotating body by the height control mechanism are cooperating at the beginning of the sticking stroke, and the control of the stop of the rotary driving and the control of the support height of the rotating body by the height control mechanism can be linked at the end of the application stroke for each stroke.

There are several patterns of operation of the automatic rotation control mechanism shown below. FIG. 9 is a drawing showing the first pattern of the automatic rotation control mechanism. The automatic rotation control mechanism according to the first pattern has a configuration in which a rotary driving mechanism is mounted on the release liner reel part 133 to enable rotation control, a stopper (not shown) is present in the roll body mounting part 131, and the switching control between permitting rotation and stopping rotation is enabled by the switching operation of the stopper. Both of the release liner reel part 133 and the roll body mounting part 131 are linked and controlled by the automatic rotation control mechanism, and the rotary sticking rolling part 132 is rotated in a driven manner. FIG. 9 (a) is a drawing showing the state of the beginning of the sticking stroke. The first sticking object 200 is conveyed directly below the rotary sticking rolling part 132. As seen in FIG. 9 (a), at the beginning of the sticking stroke, the stopper (not shown) comes off and the roll body mounting part 131 switches to permitting rotation, so that the release liner-equipped half-cut double-sided tape A becomes deliverable, and the release liner reel part 133 begins to rotate. In the state of FIG. 9 (a), the release liner-equipped half-cut double-sided tape A is unwound from the roll body mounting part 131 by the rotational force of the release liner reel part 133 and is wound to the release liner reel part 133 via the outer contact surface of the rotary sticking rolling part 132.

As shown in FIG. 9 (b), during the middle of the stroke, when the height of the rotary sticking rolling part 132 is controlled to the contacting height in contact with the sticking target part of the first sticking object 200 by the height control mechanism. The half-cut double-sided tape B is brought into contact and is rolled to the first sticking object 200 side. When the start of the rotation is synchronized by the rotation control of the roll body mounting section 131 and the release liner reel part 133 and the movement of the shift from the "separation height" to the "contact height" by the application control of the height control mechanism is linked at the beginning of the sticking stroke (sticking start), the sticking stroke can be processed even at a high conveyance speed of the conveyor apparatus 120 because the state of FIG. 9 (b) can be dealt with at a high speed.

Next, FIG. 9 (c) shows a state of the end of the sticking stroke. The first sticking object 200 is about to be transported away from below the rotary sticking rolling part 132 to apart. As seen in FIG. 9 (c), the stopper is actuated to switch the roll body mounting part 131 to the rotation stop state, and the release liner-equipped half-cut double-sided tape A becomes undeliverable. In addition, the release liner reel part 133 stops the rotary driving. In the state of FIG. 9 (c), the release liner-equipped half-cut double-sided tape A is not unwound from the roll body mounting part 131. Since the rotation is stopped, the rotation motion shown in FIG. 9 (b) does not cause excessive delivery, and no deflection generated. Further, if stopping the rotation of the roll body mounting part 131 can correspond to a high speed, it is possible to switch from FIGS. 9 (a) to 9 (c) at a high speed. In addition, even at a high speed, the half-cut double-sided tape B is accurately stuck to the first sticking object 200 side. After FIG. 9 (c), the first sticking object 200 continues to be conveyed on the conveyor device 120 as it is and is conveyed to the second sticking operation apparatus 140 and the second sticking object 300. On the other hand, after FIG. 9 (c), the rotary sticking rolling part 132 returns to the "contact height" which is provided in the next application stroke, and which is brought into contact with the sticking target portion of the next first sticking object 200 by the height control mechanism.

By repeating the motion of FIGS. 9 (a) to 9 (c), the sticking process can be performed.

Figure 10:
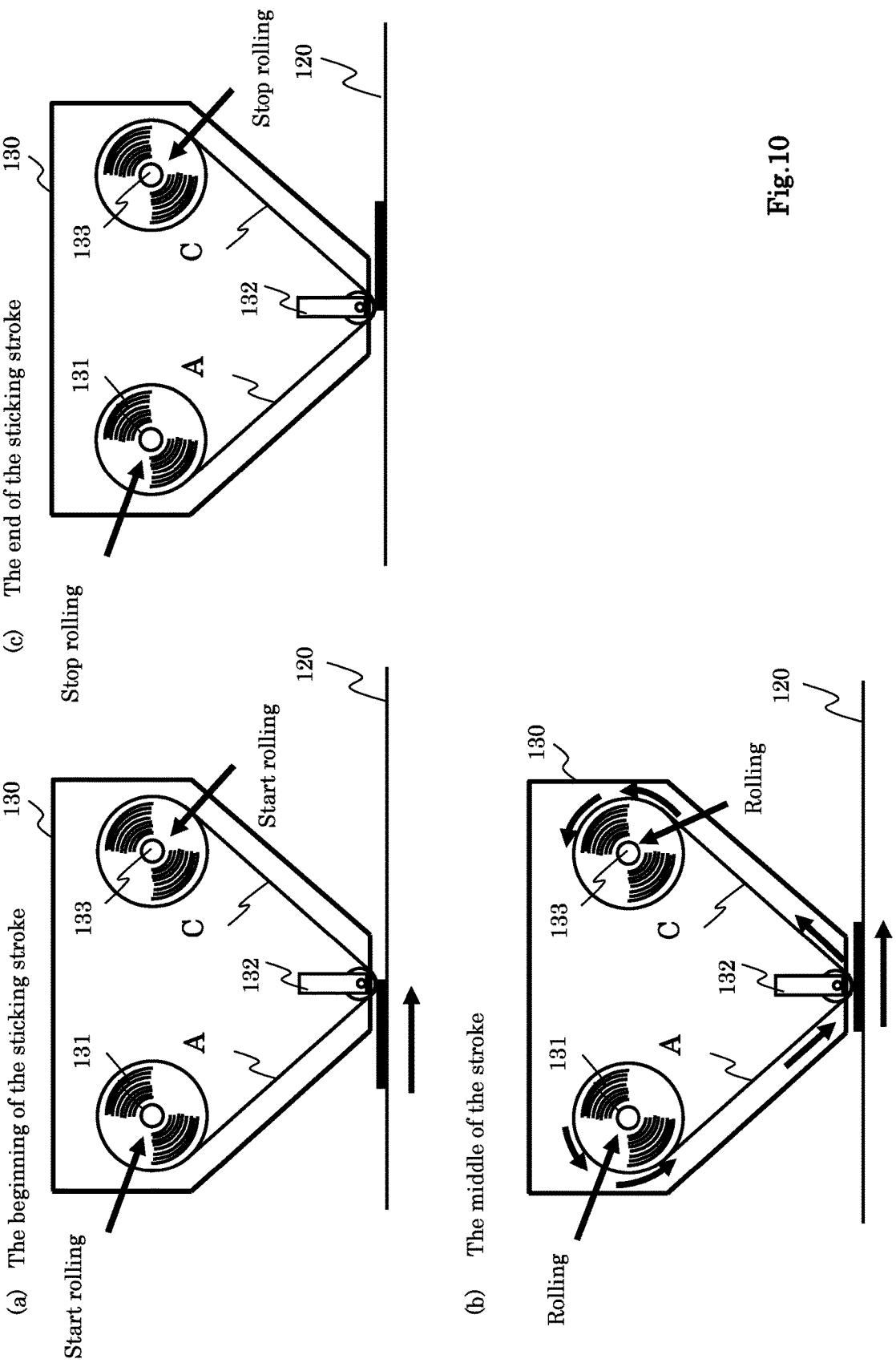
FIG. 10 (a)-(c) are drawings showing the automatic rotation control mechanism according to a second pattern.

The second pattern is configured such that the roll body mounting part 131 and the release liner reel part 133 are mounted with a rotary drive mechanism to enable rotation control. Both the roll body mounting part 131 and the release liner reel part 133 are controlled cooperating with each other, and the rotary sticking rolling part 132 is rotated in a driven manner. FIG. 10 is a drawing showing the automatic rotation control mechanism according to the second pattern. FIG. 10 (a) is a view showing the state of a beginning of the sticking stroke. The first sticking object 200 is conveyed directly below the rotary sticking rolling part 132. As seen in FIG. 10 (a), the roll body mounting part 131 is rotationally driven to allow the release liner-equipped half-cut double-sided tape A to be delivered, and the release liner reel part 133 is rotationally driven to wind the release liner C. In the state of FIG. 10 (a), the release liner-equipped half-cut double-sided tape A is unwound from the roll body mounting section 131 by both the rotation of the roll body mounting section 131 and the rotation of the release liner reel part 133, and the release liner is wound to the release liner reel part 133 via the outer surface of the rotary sticking rolling part 132.

As shown in FIG. 10 (b), during the middle of the stroke, when the height of the rotary sticking rolling part 132 is controlled to be at the contact height in contact with the sticking target portion of the first sticking object 200 by the height control mechanism, the half-cut double-sided tape B is brought into contact and is contacted to the first sticking object 200 side. Since the state of FIG. 10 (a) can be performed at a high speed, the sticking stroke can be processed even at a high transport speed of the conveyor apparatus 120.

Next, FIG. 10 (c) shows the end state of the sticking stroke. The first sticking object 200 to be stuck is about to be transported away from below the rotary sticking rolling part 132 to apart. As seen in FIG. 10 (c), the roll body mounting part 131 switches to the rotation stop, and the release liner reel part 133 stops the rotational driving, and the release liner-equipped half-cut double-sided tape A becomes undeliverable. In the state of FIG. 10 (c), since the rotation is stopped, the rotation motion shown in FIG. 10 (b) does not become excessively fed out, and no deflection generated. Further, if stopping the rotation of the roll body mounting part 131 can correspond to a high speed, it is possible to quickly switch from FIGS. 10 (a) to 10 (c). During this processes, the release liner-equipped half-cut double-sided tape A is switched to the separation height that is separated from the attachment target portion by the height control mechanism, so that the half-cut double-sided tape B is accurately stuck to the first sticking object 200 side.

The third pattern is configured such that the roll body mounting part 131, the rotary sticking rolling part 132, and the release liner reel part 133 employs the rotary drive mechanism to enable rotation control. The three components of the roll body mounting part 131, the rotary sticking rolling part 132, and the release liner reel part 133 are controlled cooperating with each other. FIG. 11 is a drawing showing the automatic rotation control mechanism relating to the third pattern. FIG. 11 (a) is a view showing the state of the beginning of the sticking stroke. The first sticking object 200 is conveyed below the rotary sticking rolling part 132. As seen in FIG. 11 (a), all the roll body mounting part 131, the rotary sticking rolling part 132 and the release liner reel part 133 switch to start of rotation, and the release liner-equipped half-cut double-sided tape A is unwound. In the state of FIG. 11 (a), the release liner-equipped half-cut double-sided tape A is delivered from the roll body mounting part 131 and is taken up to the release liner reel part 133 via the outer surface of the rotary sticking rolling part 132.

As shown in FIG. 11 (b), during the middle of the stroke, the height of the rotary sticking rolling part 132 is controlled by the height control mechanism to the contact height in contact with the sticking target portion of the first sticking object 200, so that the half-cut double-sided tape B is brought into contact and is stuck to the first sticking object 200 side. Thus, when the rotation start is synchronized by the rotation control in which the roll body mounting part 131, the rotary sticking rolling part 132 and the release liner reel part 133 are linked and the motion of the transition from the "separation height" to the "contact height" by the switching control of the height control mechanism is linked at the start of the sticking stroke (sticking start), the sticking stroke can be processed even at a high conveyance speed of the conveyor device 120.

Next, FIG. 11 (b) shows the state of the end of the sticking stroke. The first sticking object 200 to be stuck is about to be transported away from below the rotary sticking rolling part 132 to apart. As seen in FIG. 11 (b), all the roll body mounting part 131, the rotary sticking rolling part 132 and the release liner reel part 133 are also switched to rotation stop state, and the release liner-equipped half-cut double-sided tape A becomes undeliverable. In the state of FIG. 11 (b), the release liner-equipped half-cut double-sided tape A is not delivered from the roll body mounting part 131. Since the rotation is stopped, the rotation motion shown in FIG. 11 (b) does not cause excessive delivery, and no deflection is generated. Further, if stopping the rotation of the roll body mounting part 131 can correspond to a high speed, it is possible to switch from FIGS. 11 (a) to 11 (c) at a high speed. In addition, even at a high speed, the half-cut double-sided tape B is accurately stuck to the first sticking object 200 side. After FIG. 11(b), the first sticking object 200 continues to be conveyed on the conveyor device 120 as it is and is conveyed to the second sticking operation apparatus 140 and the second sticking object. After FIG. 11 (b), the rotary sticking rolling part 132 returns to the "contact height" which is provided in the next application stroke and whose height is in contact with the sticking target portion of the next first sticking object 200 by the height control mechanism. The sticking process can be performed by repeating the switching of FIGS. 11 (a) to 11 (c) at a high speed.

Next, a structural configuration in the rotary sticking rolling part 132 will be described. The rotary sticking rolling part 132 includes a rotating body 1321 and a support mechanism 1322 that supports the rotating shaft of the rotating body 1321. It is further provided with a suspension movement mechanism that allows vertical movement of the rotating body 1321 according to the surface of the object to be stuck, and a steering movement mechanism that changes the angle within the horizontal plane of the rotating body 1321.

Figure 12:
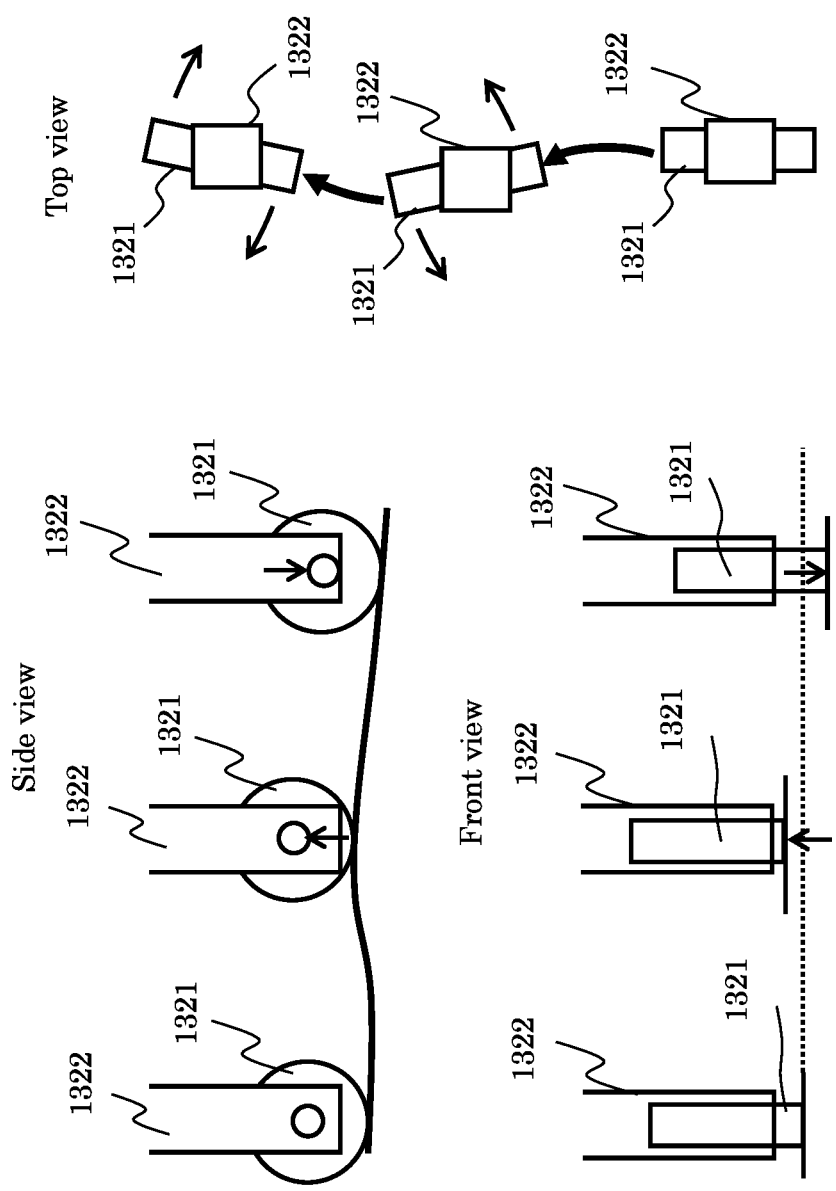
FIG. 12 (a)-(b) are drawings schematically showing a suspension movement mechanism of the rotating body 1321 and a steering movement mechanism of the rotating body 1321.

FIG. 12 (a) is a drawing showing simplified illustration of the "suspension motion mechanism" of the rotary sticking rolling part 132. FIG. 12 (a) is a drawing schematically showing a part of the rotary sticking rolling part 132 of the sticking apparatus 100 necessary for the description. Other structures omit the illustration from FIG. 12. It should be noted that the "suspension movement mechanism" of the rotating body 1321 referred to herein does not refer a height change from the "contact height" and the "separation height" of the rotating body in the height control mechanism of the support mechanism already described above, but refers to the suspension motion that follows the unevenness of the surface body to be stuck in the keep of the "contact state" of the rotating body in the height control mechanism during the "sticking start" to the "sticking period" in the sticking stroke. Although there are a variety of suspension movement mechanisms that allow vertical movement of the rotating body 1321 with respect to the object to be stuck. For example, the rotating body 1321 is composed of an elastic body such as a rubber material, a silicone material, a sponge material, or the like (not shown). As shown in FIG. 12 (a), the configuration incorporating an elastic body such as a spring for swinging the rotation shaft in a vertical direction and the configuration incorporating an air spring are also possible in the support mechanism 1322 supporting the rotating body 1321.

FIG. 12 (b) is s a drawing showing simplified illustration of the steering motion mechanism of the rotary sticking rolling part 132. Although the "steering motion mechanism" is a steering motion mechanism in which the rotating body varies in angle within a horizontal plane, a "steering motion mechanism" may be incorporated into the support mechanism 1322 or may be incorporated into a robotic arm that supports the entire sticking apparatus 100 to alter the angle within the horizontal plane. FIG. 12 (b) is such that the support mechanism 1322 supporting the axis of rotation can be controlled to vary in angle within the horizontal plane. As shown in FIG. 12 (b), the angle can be changed actively by external support, and the angle may be changed in accordance with the direction of travel direction of the sticking apparatus 100.

Figure 13:
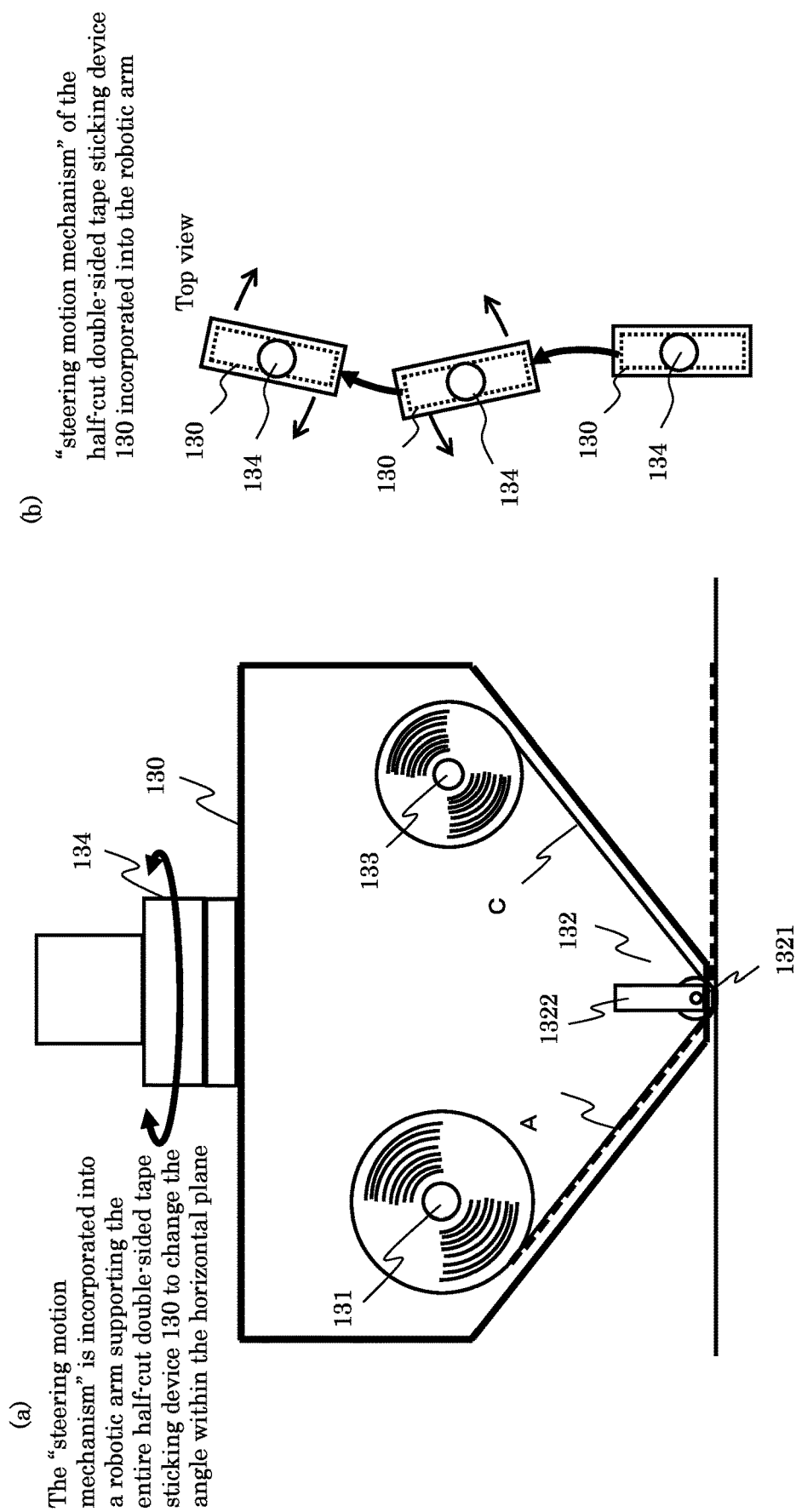
FIG. 13 (a)-(b) are drawings showing an example in which the steering motion mechanism of the rotating body 1321 is incorporated into the robotic arm.

FIG. 13 is a drawing showing the "steering motion mechanism" is incorporated into a robotic arm that supports the entire sticking apparatus 100 to change the angle within the horizontal plane. In the example of FIG. 13, the improved sticking apparatus 100 is in the head 440 of the robotic arm and the entire head 440 is rotatable in a horizontal plane by the steering mechanism 450 to actively curve the application direction. The rotary body 1321 of the rotary sticking rolling part 132 may be a single rotating body or a pair of left and right rotating bodies.

As shown above, a so-called "steering motion" that changes an angle in a horizontal plane as shown in FIG. 12 (b) and FIG. 13 and a so-called "suspension motion" that swings up and down are employed, so that a so-called curve or vertical motion is possible between the rotary sticking rolling part 132 and the surface of the sticking target portion, and three-dimensional tracking can be performed even in the case of a curved or uneven curved surface where the sticking target portion is uneven, as if the vehicle is traveling.

The three-dimensional trace of the half-cut double-sided tape stuck by the sticking apparatus according to the present invention is shown below. Since the release liner-equipped half-cut double-sided tape can be applied to the sticking target portion in an independent state, it is possible to peel and stick the half-cut double-sided tape so as to draw a curve as a whole when peeled from the release liner 120.

Figure 14:
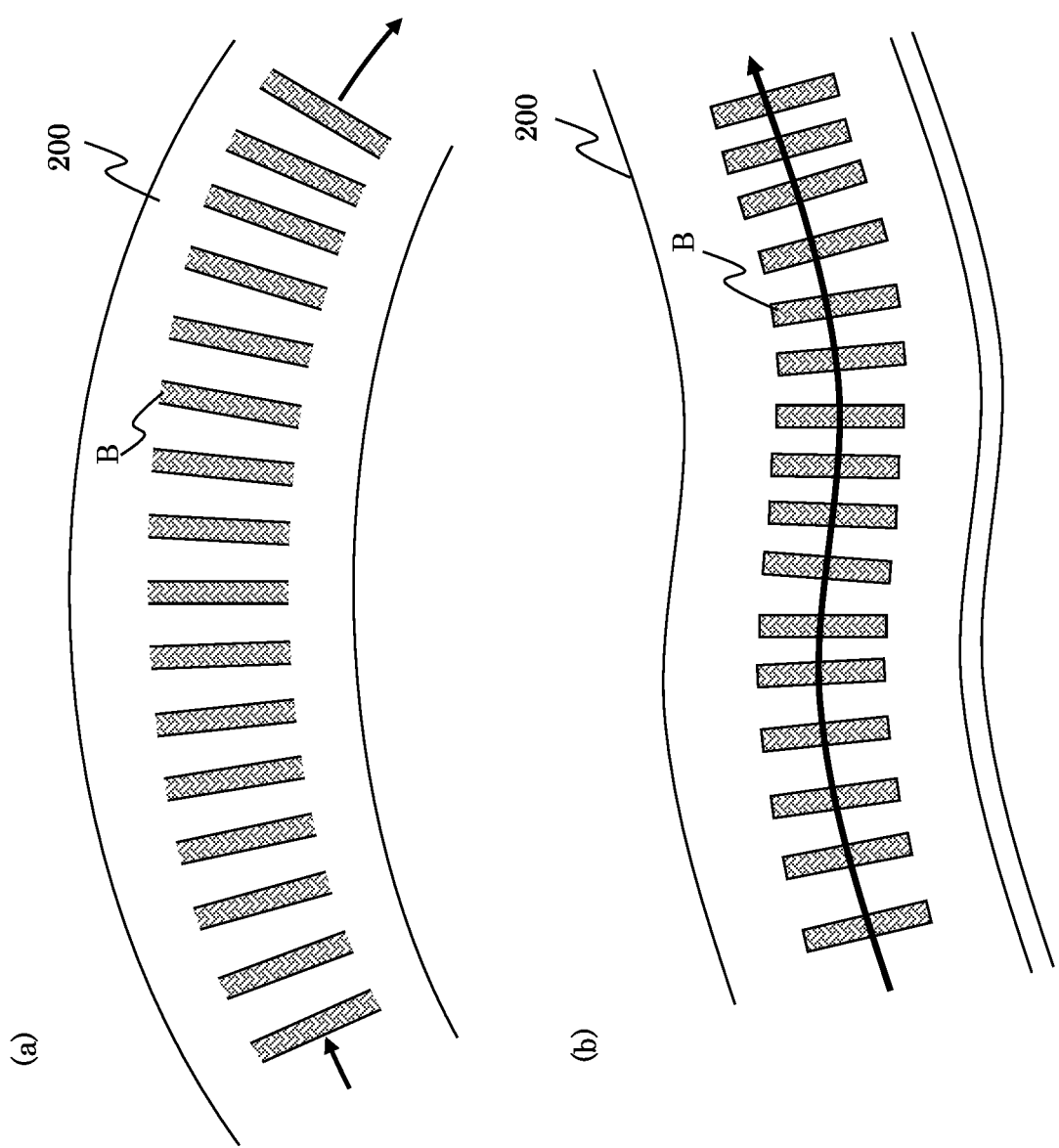
FIG. 14 (a)-(b) are drawings showing a state in which a curve and a vertical movement can be drawn in the sticking trace of the half-cut double-sided tape A.

FIG. 14 is a drawing showing a state in which a curve and a vertical movement can be drawn in the sticking trace of the half-cut double-sided tape. It should be noted that, in practice, since the cutting edge of the half-cutting machine is sharp, the spacing of each strip-shaped double-sided tape piece on the release liner 120 is small. However, the distance between each strip-like double-sided tape piece is simply shown to be large to understand the shape and sticking trace of each strip-like double-sided tape piece easily.

FIG. 14 (a) is a drawing schematically showing a state in which half-cut double-sided tape is stuck along an arc-shaped curve on a surface of an object to be applied. FIG. 14 (b) is a drawing schematically showing a state in which half-cut double-sided tape is stuck along a curved surface on a surface of a curved object to be stuck. Thus, according to the sticking apparatus 100 of the present invention, the double-sided tape can be stuck by using the half-cut double-sided tape. The use application of the double-sided tape is expanded, since the double-sided tape can be drawn along a curve or a curved surface.

Figure 15:
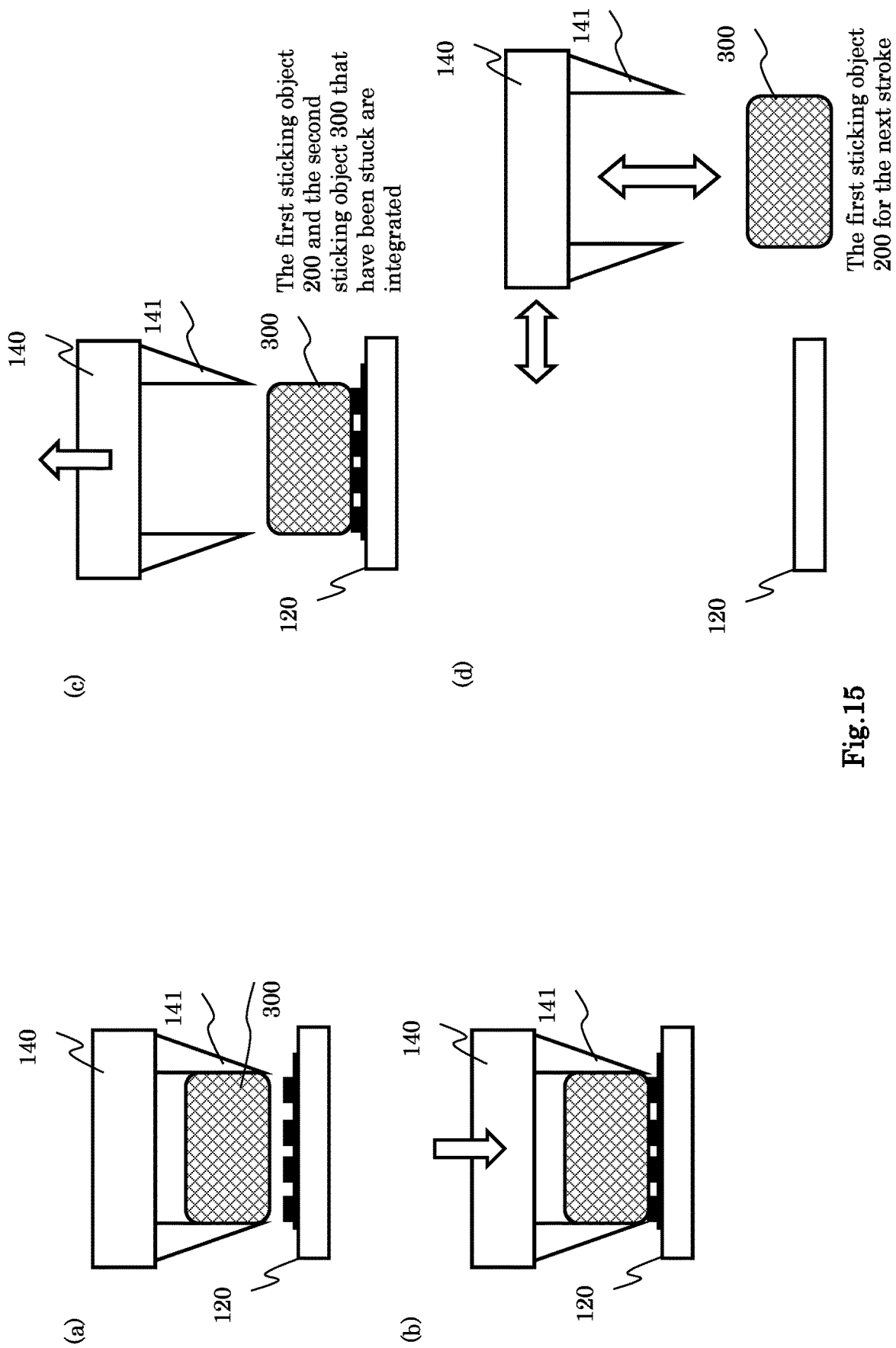
FIG. 15 (a)-(d) are drawings schematically showing a sticking process in the second sticking operation apparatus 140 for the second sticking object in Embodiment 1.

Next, a sticking process in the second sticking operation apparatus 140 for the second sticking object will be described below. The second sticking operation apparatus 140 for the second sticking object attaches the second sticking object 300 to the sticking part of the first sticking object 200 where the half-cut double-sided tape is stuck and presses the second sticking object 300. FIG. 15 is a drawing schematically showing a sticking process in the second sticking operation apparatus 140 for the second sticking object 300. FIG. 15 depicts the cross-section of the conveyor apparatus 120 in a front view. For example, it is assumed that the conveyor device 120 is traveling from the back of the shown figure toward the front of the shown figure. In this example, the second sticking operation apparatus 140 for the second sticking object is provided with a movable section 141 for holding and moving or lifting the second sticking object 300. The mechanism of the movable section 141 for holding and moving or lifting the second pasting object 300 is installed near the conveyance path of the conveyor apparatus 120.

As shown in FIG. 15 (a), from the upstream side of the conveyor device 120, the first sticking object 200 to which the half-cut double-sided tape B has been stuck is conveyed and reaches the position of the second sticking operation apparatus 140 for the second sticking object. The movable grip part 141 of the second sticking operation apparatus 140 for the second sticking object grips the second sticking object 300. The first sticking object 200 to which the half-cut double-sided tape B has been stuck is located just below the movable grip part 141 of the second sticking operation apparatus 140 which holds the second sticking object 300.

Next, as shown in FIG. 15 (b), the movable grip part 141 of the second sticking operation apparatus 140 descends while holding the second sticking object 300. The second sticking object 300 is placed on the sticking point of the half-cut double-sided tape on the first sticking object 200 and pressed by an appropriate pressing force. As a result, the first sticking object 200 and the second sticking object 300 are both stuck and integrated by the adhesive force of the half-cut double-sided tape.

As shown in FIG. 15 (c), the movable grip part 141 of the second sticking operation apparatus 140 for the second sticking object opens grip mechanism and rises from the second sticking object 300. After the first sticking object 200 and the second sticking object 300 that have been stuck are integrated, the first sticking object 200 and the second sticking object 300 are conveyed to the next stage by the conveyor apparatus 120. It should be noted that it is better stopping the motion of the conveyor device 120 during the state shown by FIGS. 15 (a) to 15 (b) because the movable grip part 141 in the sticking motion, the conveyor apparatus 120 may be temporarily stopped at the moment when the conveyor apparatus 120 becomes the state of FIG. 15 (a), and the conveyance of the conveyor apparatus 120 is resumed at the stage of FIG. 15 (c) after the operation of FIG. 15 (b).

After FIG. 15 (c), as shown in FIG. 15 (d), the movable grip part 141 of the second sticking operation apparatus 140 moves toward the second sticking object 300 subjected to the next sticking process, and after gripping the second sticking object 300 subjected to the next sticking process (not shown), moves further to the state shown by FIG. 15 (a). Operation shown from FIGS. 15 (a) to 15 (d) is repeated. The operation of FIGS. 15 (a) to 15 (d) is an example and other operations are possible. Operation of the entire sticking apparatus 100 will repeat the pattern of FIG. 2 to FIG. 6.

Embodiment 2

Next, the sticking apparatus 100 A for the half-cut double-sided tape according to Embodiment 2 will be described. In the half-cut double-sided tape sticking apparatus 100 A according to Embodiment 2, the relationship between the first sticking object and the second sticking object is reversed. That is, in this Embodiment 2, the first sticking object 200 A set in the feeder device 110 A is a shrink-wrapped commodity, and the second sticking object 300 A set to second sticking operation apparatus 140 A.

Figure 16:
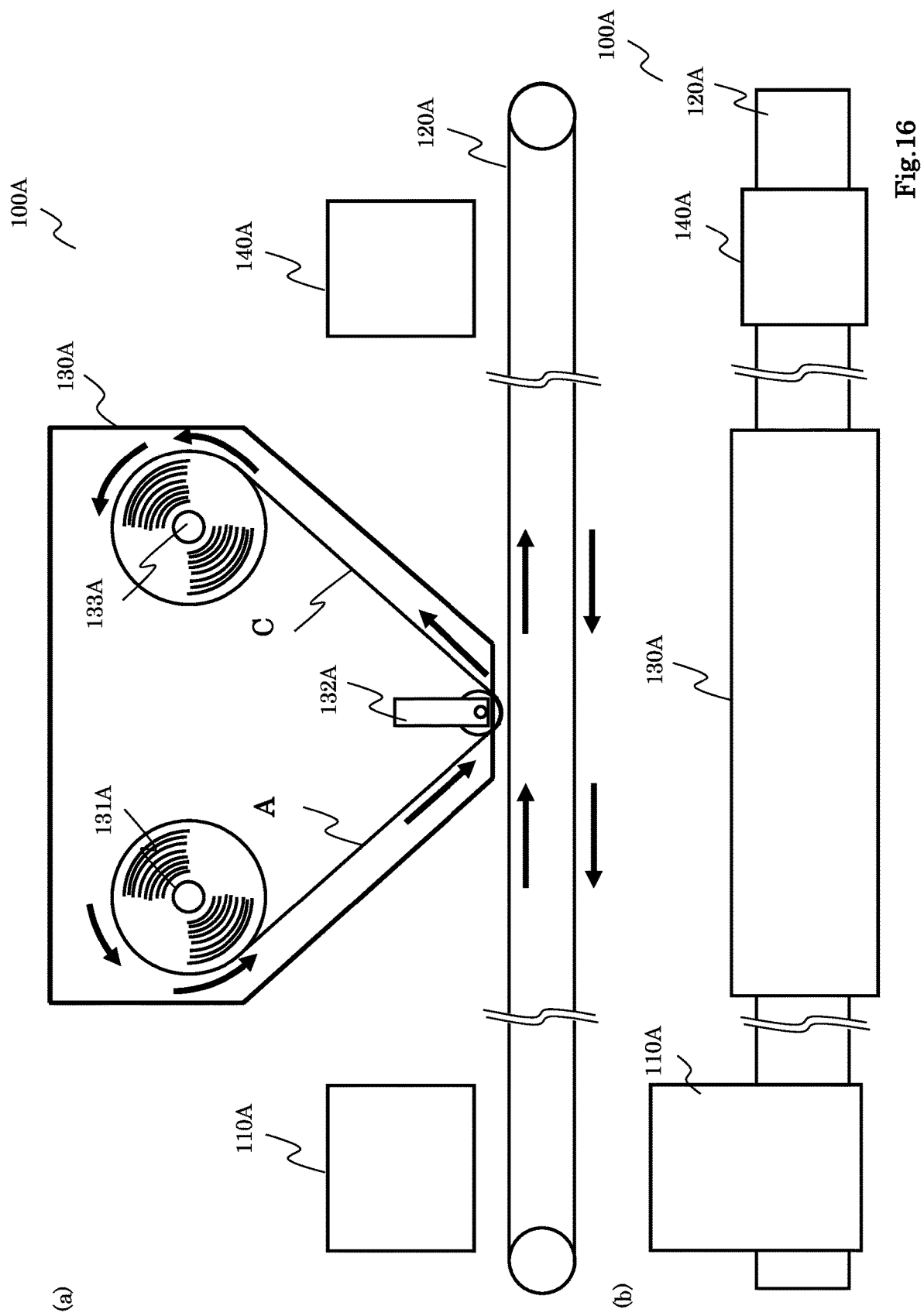
FIG. 16 (a)-(b) are schematic views schematically showing a configuration of the sticking apparatus 100A of the half-cut double-sided tape according to Example 2 of the present invention.

FIG. 16 is a drawing schematically showing a configuration of the sticking apparatus 100 A according to Embodiment 2. FIG. 16 (a) shows the configuration of the sticking apparatus 100 A according to Embodiment 2 viewed from the side view, and FIG. 16 (b) shows the configuration of the sticking apparatus 100 A according to Embodiment 2 as viewed from plane view. As shown in FIG. 16 (a), the sticking apparatus 100 A according to Embodiment 2 includes a feeder device 110 A, a conveyor apparatus 120 A, a half-cut double-sided tape sticking device 130 A, and a second sticking second sticking operation apparatus 140 A. In this example, the first sticking object 200 A set in the feeder device 110 A is a shrink-wrapped commodity, and the second sticking object 300 A set to the second sticking operation apparatus 140 A.

The configuration of each part of the sticking apparatus 100 A according to Embodiment 2 will be described. The feeder device 110 A is a device that supplies the first sticking object 200 A to the conveyor device 120 in a predetermined state, but in Embodiment 2, the first sticking object 200 A set in the feeder device 110 A is a shrink-wrapped commodity. The structure itself of the feeder device 110 A is not limited, but may depending on the shape and size of the first sticking object 200 A to be fed. Although the supply method of the first sticking object 200 A to the feeder device 110 A is not limited, the stacker may be provided to pre-supply the plurality of first sticking object 200 A into the stacker, or there is a pre-stage conveyor apparatus connected to the feeder device 110 A, which may be a structure in which the shrink-wrapped commodity flows the first sticking object 200 A. In this example, the feeder apparatus 110 A includes a movable grip part 111 for gripping and moving or lifting the first attachment object 200 A. An example of a mechanism for holding and moving or lifting the first sticking object 200 A installed near the conveyance path of the conveyor apparatus 120 A by the movable grip section 111. The conveyor apparatus 120 A may be same as the conveyor apparatus 120 shown in Embodiment 1.

The half-cut double-sided tape sticking device 130 A may be similar to the half-cut double-sided tape sticking device 130 shown in Embodiment 1. The half-cut double-sided tape sticking device 130 A comprises a roll body mounting part 131 A, a rotary sticking rolling part 132 A and a release liner reel part 133 A shown in Embodiment 1. The support mechanism and the automatic rotation control mechanism may be similar to those shown in Embodiment 1.

The second sticking operation apparatus 140 A is an apparatus for placing and pressing the second sticking object 300 A with respect to the sticking position of the half-cut double-sided tape of the first sticking object 200 A. In this Embodiment 2, the second sticking object 300 A sets in the second sticking operation apparatus 140 A. It should be noted that the supply method of the second sticking object 300 A to the second sticking operation apparatus 140 A is not limited, but may be a system including a stacker and supplying a plurality of second sticking objects 300 A in advance into the stacker, or may further include a previous stage device connected to the second sticking operation apparatus 140 A providing the second sticking object 300 A.

Figure 17:
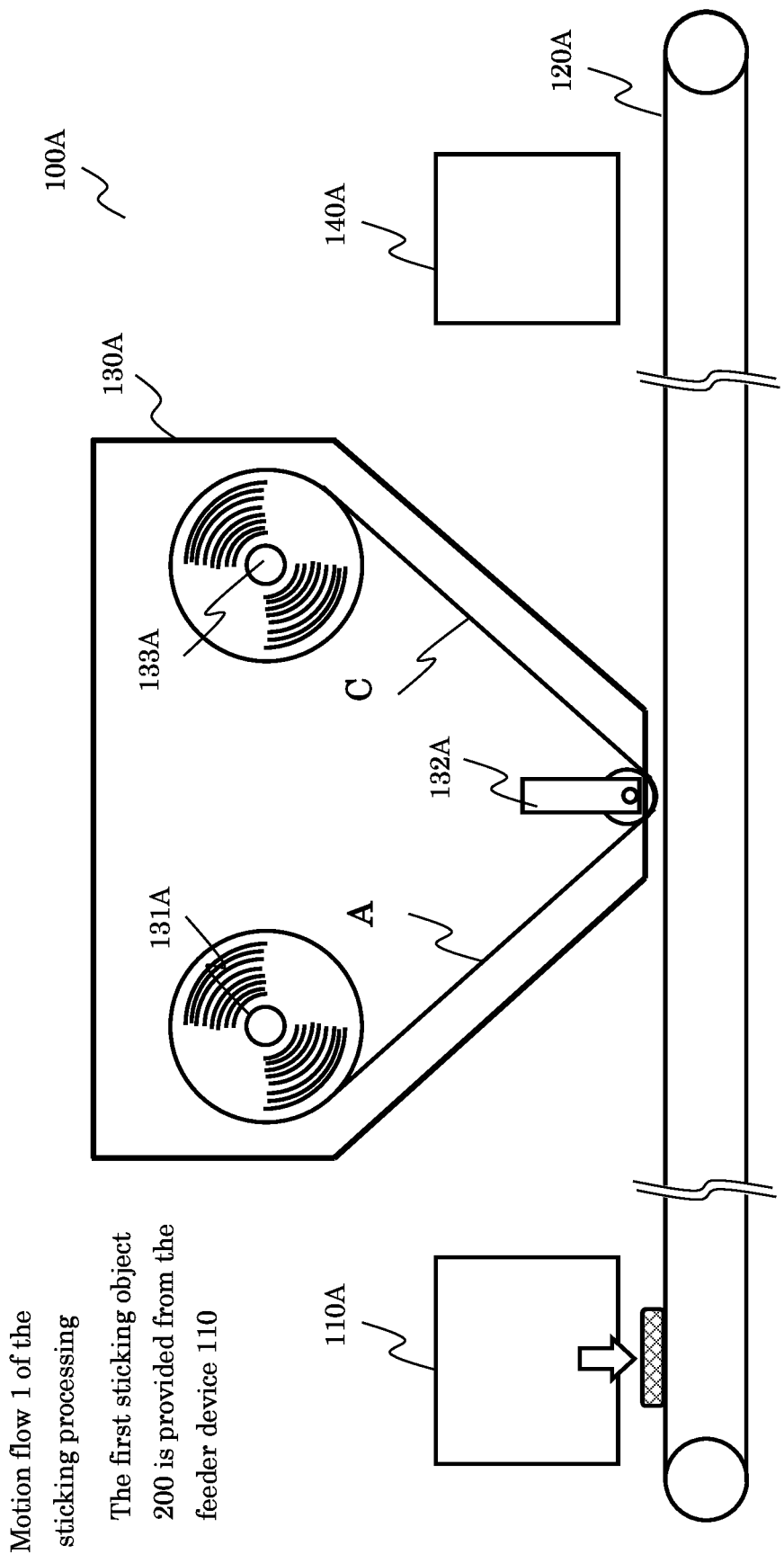
FIG. 17 is a schematic view of the overall motion flow (part 1) of the sticking apparatus 100A of the present invention according to Embodiment 2.

Hereinafter, the example motion of the sticking apparatus 100 A of the present invention according to Embodiment 2 is described. FIG. 17 to FIG. 21 are schematic views of the overall motion flow of the sticking apparatus 100 A according to Embodiment 2. First, as shown in FIG. 17, the first sticking object 200 A is provided from the feeder device 110 A to the conveyance path on the conveyor apparatus 120 A. It is a shrink-wrapped commodity. Although the conveyor apparatus 120 A may be constantly traveling, the conveyor apparatus 120 A may be intermittently driven to temporarily stop the belt travel.

Figure 18:
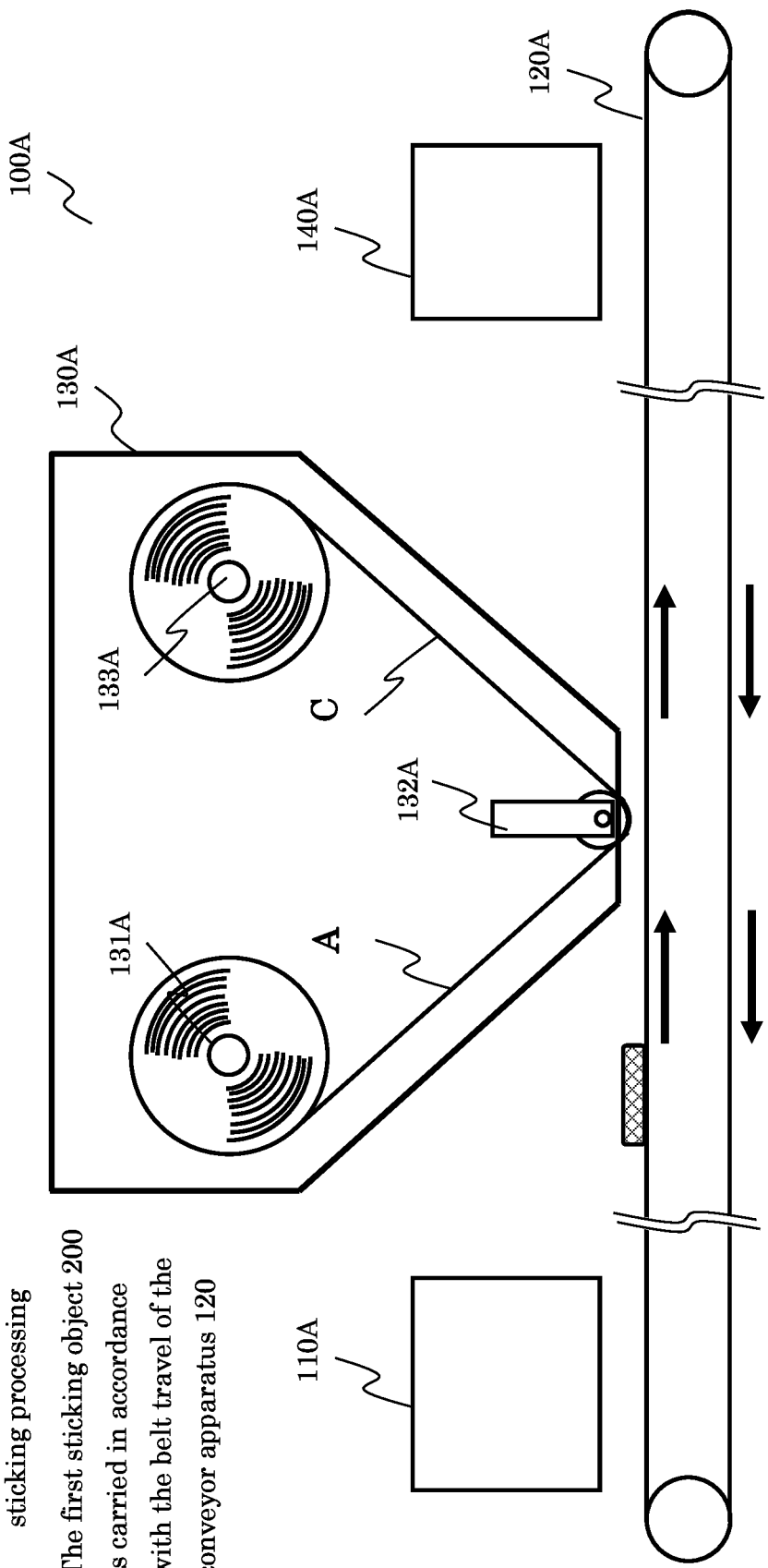
FIG. 18 is a schematic view of the overall motion flow (part 2) of the sticking apparatus 100A of the present invention according to Embodiment 2.
Figure 19:
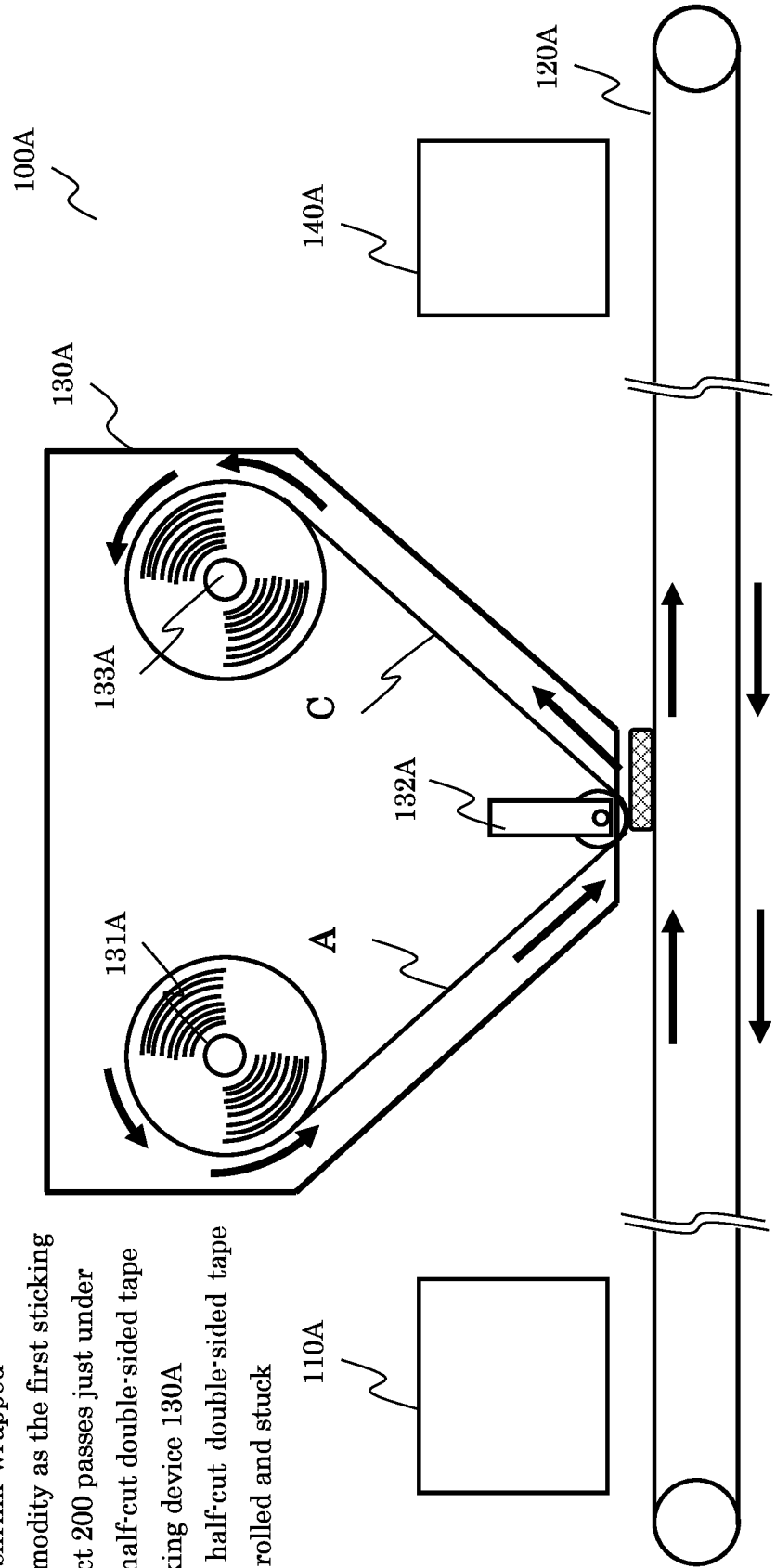
FIG. 19 is a schematic view of the overall motion flow (part 3) of the sticking apparatus 100A of the present invention according to Embodiment 2.
Figure 20:
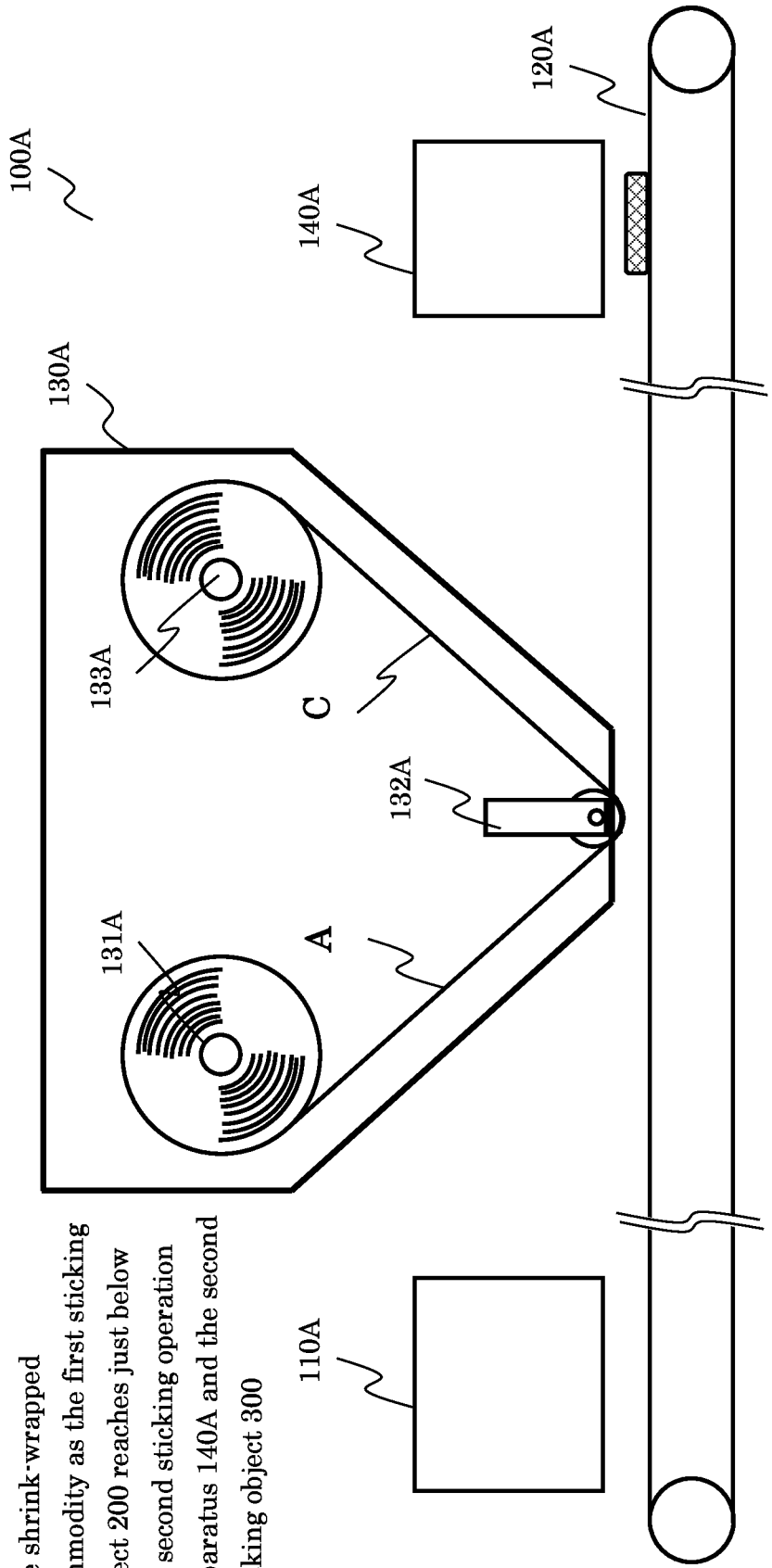
FIG. 20 is a schematic view of the overall motion flow (part 4) of the sticking apparatus 100A of the present invention according to Embodiment 2.

Next, as shown in FIG. 18 to FIG. 20, the first sticking object 200 A is conveyed according to the belt travel of the conveyor apparatus 120 A. As used herein, the article to be conveyed is a shrink-wrapped commodity. Here, as shown in FIG. 19, the first sticking object 200 A passes below the half-cut double-sided tape sticking device 130 A. At that time, the height of the rotary sticking rolling unit 132 A is controlled with respect to the first sticking object 200 A conveyed in a predetermined state on the conveyor device 120 A. The release liner-equipped half-cut double-sided tape on the outer surface of the rotary sticking rolling unit 132 A is brought into contact with the predetermined position of the first sticking object 200 A. Thereby the half-cut double-sided tape becomes contact and stick to first sticking object 200 A. Here, the half-cut double-sided tape is stuck to the predetermined portion of the shrink-wrapped commodity.

Figure 21:
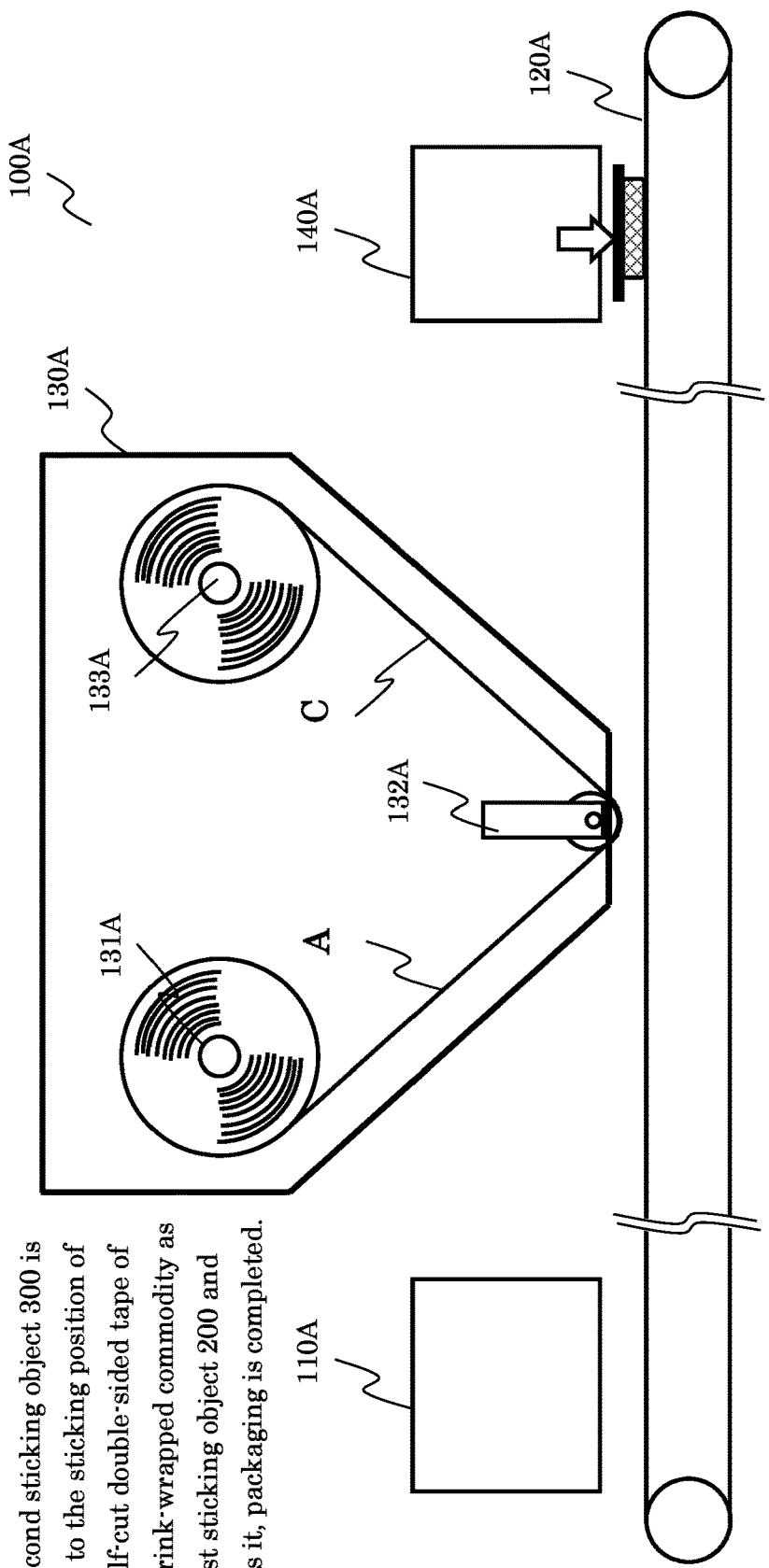
FIG. 21 is a schematic view of the overall motion flow (part 5) of the sticking apparatus 100A of the present invention according to Embodiment 2.
Figure 22:
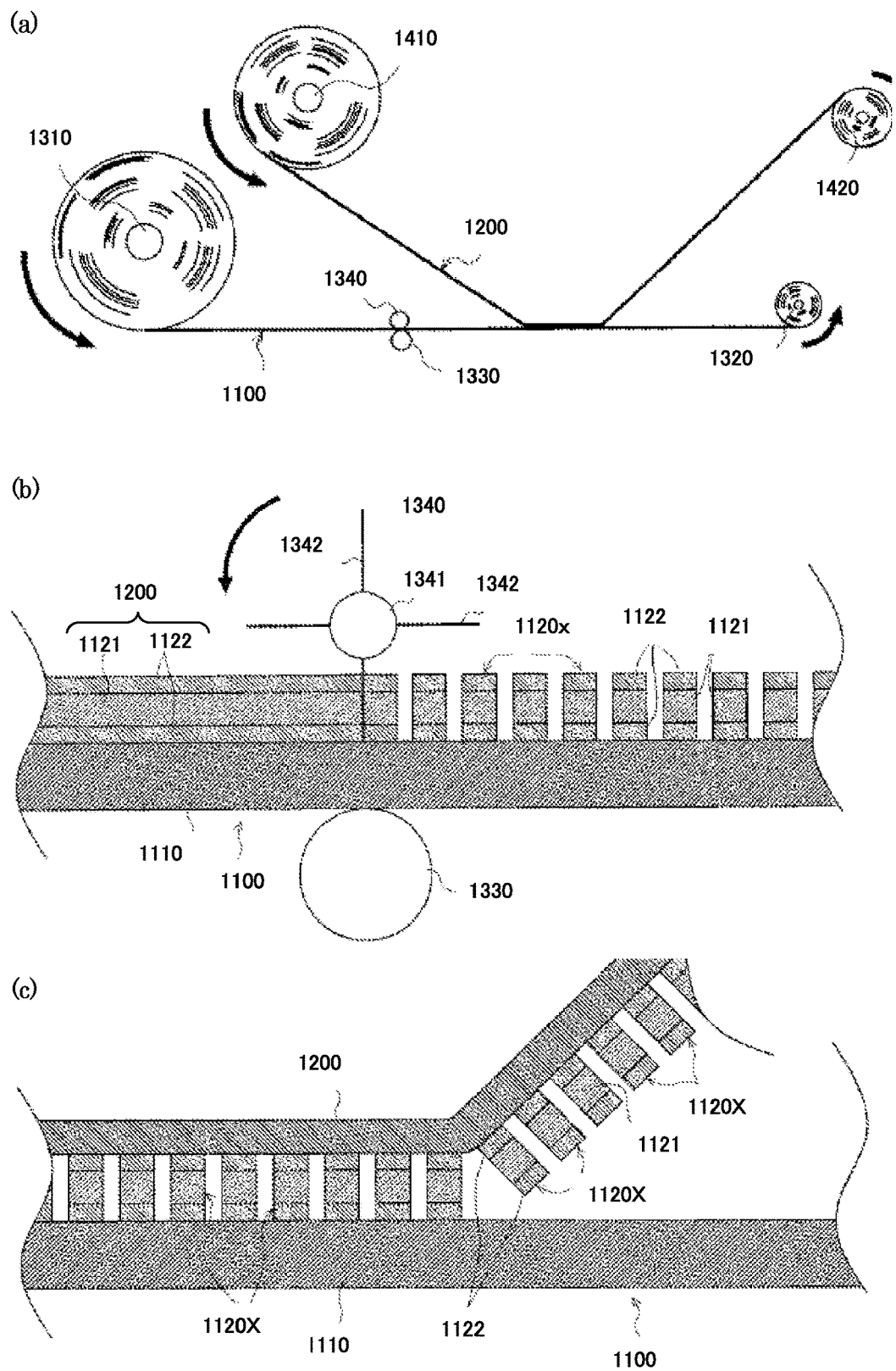
FIG. 22 is a schematic view showing a conventional process of a method for manufacturing a half-cut double-sided tape disclosed in JP 2016-008262 in the prior art.

Next, as shown in FIG. 20, the first sticking object 200 A reaches just below the second sticking operation apparatus 140 A. Next, as shown in FIG. 21, the second sticking operation apparatus 140 A according to Embodiment 2 places the second sticking object 300 A, in a predetermined state with respect to the sticking position of the half-cut double-sided tape of the first sticking object 200 A and presses it. Here, the shrink-wrapped commodity is pressed to the second sticking object 300 A with an appropriate pressing force to integrate them together. As a result, both the first sticking object 200 A and the second sticking object 300 A become integrated. This is a schematic of the overall motion of the sticking apparatus 100 A of the present invention according to Embodiment 2.

While some preferable embodiments of the sticking apparatus according to the present invention are described above, it should be understood that various changes are possible, without deviating from the technical scope according to the present invention.

Industrial applicability

A sticking apparatus sticking a half-cut double-sided tape according to the present invention can be widely applied as a sticking apparatus for sticking half-cut double-sided tape regardless of the type of an adhesive layer, the width of a tape, the diameter of a roll, and the like.

DESCRIPTION OF THE REFERENCE NUMERALS

100 sticking apparatus
110 feeder device
120 conveyor apparatus
130 half-cut double-sided tape sticking device
131 roll body mounting part
132 rotary sticking rolling part
133 release liner reel part
140 second sticking operation apparatus

I claim:

1. A sticking apparatus for sticking a half-cut double-sided tape, which is half-cut into a large number of small pieces, from a release liner to a predetermined position of a first sticking object conveyed on a conveyor apparatus in a predetermined state, for mounting a second sticking object in a predetermined state with respect to the sticking predetermined position of the half-cut double-sided tape on the first sticking object, comprising:

a feeder device configured to supply the first sticking object to the conveyor apparatus in the predetermined state, the conveyor apparatus conveying the first sticking object in the predetermined state;

a half pre-cut double-sided tape sticking device, comprising:

a roll body mounting part from which the release liner-equipped half pre-cut double-sided tape is delivered, a rotary sticking rolling part through which the release liner-equipped half pre-cut double-sided tape passes, and a release liner reel part for reeling the release liner that has passed through the rotary sticking rolling part;

a second sticking operation apparatus configured to place and press the second sticking object with respect to the sticking place of the half pre-cut double-sided tape on the first sticking object;

wherein the rotary sticking rolling part comprises:

a rotating body, and a support mechanism for rotatably supporting the rotating body, wherein the support mechanism comprises a height control mechanism that is configured to control a height for supporting the rotating body, and wherein at least one of the roll body mounting part or the release liner reel part comprise an automatic rotation control mechanism that is configured to control rotation.

2. A sticking apparatus according to claim 1, wherein the height control mechanism is further configured to perform a sticking control to change the height of the release liner-equipped half pre-cut double-sided tape to a contact height at which the release liner-equipped half pre-cut double-sided tape contacts on the portion to be stuck and a separation height that is separated from the portion to be stuck.

3. A sticking apparatus according to claim 2, wherein a motion from the contact height to the separation height is a vertically upward direction, an obliquely upward direction of the stuck half pre-cut double-sided tape, or an obliquely backward direction of the stuck half pre-cut double-sided tape.

4. A sticking apparatus according to claim 1, wherein the automatic rotation control mechanism, for each sticking stroke of the release liner-equipped half pre-cut double-sided tape, is configured to link together controls including:
- controlling a start of a rotary drive of at least one of the roll body mounting part or the release liner reel part and the control of the support height of the rotating body by the height control mechanism at the start of the sticking stroke; and
- controlling a stop of the rotary drive of at least one of the roll body mounting part or the release liner reel part; and
- controlling the support height of the rotating body by the height control mechanism at the end of the sticking stroke.

5. A sticking apparatus according to claim 4, wherein, for the rotation in the automatic rotation control mechanism:
- the release liner reel part is configured to control the rotary drive,
- the rotary sticking rolling part is configured to switch between rotation permission and rotation stop,
- both the release liner reel part and the roll body mounting part are linked and controlled, and
- the rotary sticking rolling part is rotated in a driven manner.

6. A sticking apparatus according to claim 4, wherein, for the rotation in the automatic rotation control mechanism:
- the release liner reel part and the roll body mounting part control the rotary drive,
- both the release liner reel part and the roll body mounting part are controlled cooperating with each other, and
- the rotary sticking rolling part is rotated in a driven manner.

7. A sticking apparatus according to claim 4, wherein the rotation control by the automatic rotation control mechanism includes controlling cooperation of the release liner reel part, the rotary sticking rolling part and the roll body mounting part control rotational drive.

8. A sticking apparatus according to claim 1, wherein
- the first sticking object is a mount, and
- the second sticking object is a shrink-wrapped article.

9. A sticking apparatus according to claim 1, wherein
- the first sticking object is a shrink-wrapped article, and
- the second sticking object is a mount.

10. A sticking apparatus according to claim 2, further comprising a suspension motion mechanism for following a contour of the body to maintain contact height of the rotating body in the height control mechanism of the support mechanism.

11. A sticking apparatus according to claim 10, wherein the suspension motion mechanism is an elastic body provided by the rotating body material.

12. A sticking apparatus according to claim 10, wherein the suspension motion mechanism is a vertically oscillating swing mechanism provided in the support mechanism.

13. A sticking apparatus according to claim 1, further comprises a steering motion mechanism configured to change an angle in a horizontal plane of the rotating body.

14. A sticking apparatus according to claim 13, wherein the steering motion mechanism is incorporated in the support mechanism or is incorporated in a robot arm supporting the entire sticking apparatus to change an angle in a horizontal plane of the entire sticking apparatus.

15. A sticking apparatus according to claim 1, wherein the rotating body of the rotary sticking rolling part is a single rotating body or a pair of left and right rotating bodies.

* * * * *